United States Patent
Irita et al.

(10) Patent No.: US 8,590,999 B2
(45) Date of Patent: Nov. 26, 2013

(54) INK COMPOSITION, INK SET AND IMAGE FORMING METHOD USING THE SAME

(75) Inventors: Kiyoshi Irita, Kanagawa (JP); Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 91 days.

(21) Appl. No.: 13/029,134

(22) Filed: Feb. 17, 2011

(65) Prior Publication Data
US 2011/0205289 A1    Aug. 25, 2011

(30) Foreign Application Priority Data
Feb. 25, 2010    (JP) .................................. 2010-040504

(51) Int. Cl.
*B41J 2/015*    (2006.01)
(52) U.S. Cl.
USPC .............................................. 347/21; 347/95
(58) Field of Classification Search
USPC ................ 347/15, 40, 43, 95–100; 106/31.13
See application file for complete search history.

(56) References Cited

U.S. PATENT DOCUMENTS

| 7,253,216 B2 * | 8/2007 | Miyabayashi ................ 523/205 |
| 2005/0288384 A1 | 12/2005 | Kanke et al. |

FOREIGN PATENT DOCUMENTS

| EP | 0337705 A2 | 10/1989 |
| EP | 2166046 A1 | 3/2010 |
| JP | 10-287035 A | 10/1998 |
| JP | 2001-115067 A | 4/2001 |
| JP | 2007002151 A | 1/2007 |
| JP | 2007-314610 A | 12/2007 |
| WO | 2008/123478 A1 | 10/2008 |

OTHER PUBLICATIONS

Corresponding EPO Official communication.

* cited by examiner

*Primary Examiner* — Thinh Nguyen
(74) *Attorney, Agent, or Firm* — SOLARIS Intellectual Property Group, PLLC

(57) ABSTRACT

The present invention provides an ink composition including: a pigment, a water-soluble polymerizable compound (A) having an acrylamide structure in a molecule thereof, a water-soluble solvent (B), and water, in which a mass ratio of the polymerizable compound (A) and the water-soluble solvent (B) satisfies $1/10 \leq B/A \leq 2/3$.

15 Claims, 1 Drawing Sheet

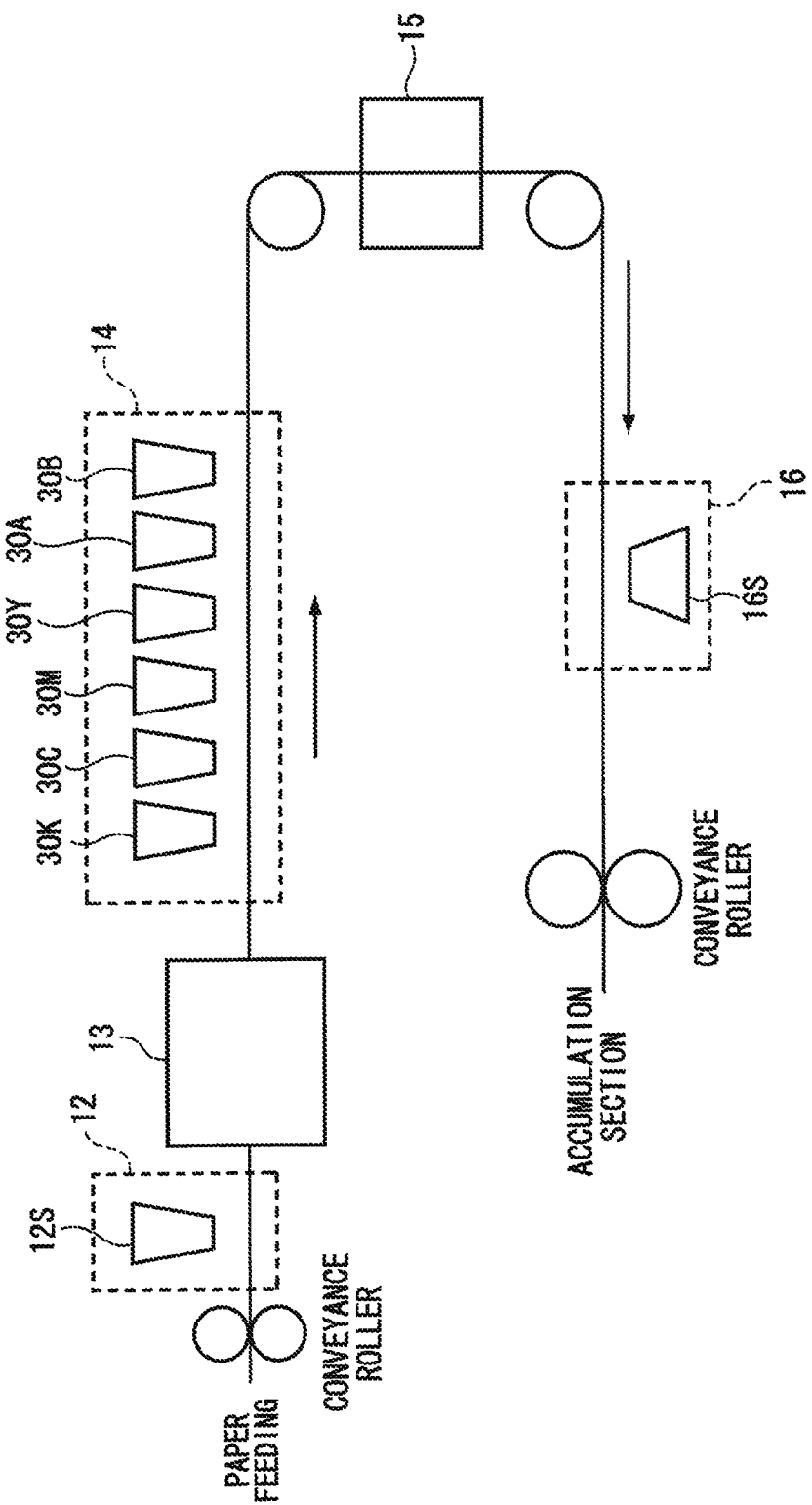

INK COMPOSITION, INK SET AND IMAGE FORMING METHOD USING THE SAME

CROSS-REFERENCE TO RELATED APPLICATION

This application claims priority under 35 USC 119 from Japanese Patent Application No. 2010-040504, filed on Feb. 25, 2010, the disclosure of which is incorporated by reference herein.

BACKGROUND OF THE INVENTION

1. Field of the Invention

The present invention relates to an ink composition, an ink set suitable for recording an image by jetting an ink according to an ink-jet method, and an image forming method using the same.

2. Description of the Related Art

The ink-jet technique has been applied as an image recording method for recording color images in the fields of an office printer, a home printer, and the like. Ink for use in ink-jet recording has been examined to improve the rubbing resistance by blending a polymerizable monomer in an aqueous pigment ink and curing the same. For example, an ink-jet recording method is disclosed that includes applying a reaction mixture containing a reaction agent that generates an aggregate upon contact with an ink composition and a photopolymerization initiator and an ink composition containing an acrylate monomer or a resin emulsion to a recording medium, and performing printing (e.g., Japanese Patent Application Laid-Open (JP-A) No. 10-287035).

In addition, it has been examined to increase the degree of crosslinking of images to be formed to thereby increase the degree of adhesion to a recording medium. For example, active energy ray-curing type aqueous inks that contain a polymerizable monomer having a specific structure are disclosed (e.g., JP-A No. 2007-314610).

Furthermore, as a technique for improving the adhesion to a recording medium that does not absorb ink, such as plastic, the use of an ink composition containing a specific polymerizable monomer is disclosed (e.g., JP-A No. 2001-115067).

However, according to each technique described above, the ejection stability (recovery from leaving), in a case in which the ejection of an ink composition is stopped, and then after a head is left as it is for a given period of time, the ejection is re-started on an ink-jet recording device, is extremely insufficient.

According to the method disclosed in JP-A No. 10-287035, for the aqueous pigment ink in which an aqueous medium is used, the solubility of a monomer is not considered. As a result, a problem occurring when a water-soluble monomer is added cannot be avoided. Such an ink composition is problematic in that the monomer and the pigment are separated, and thus it is difficult to obtain sufficient curing properties of image are, and also in addressing a phenomenon (blocking) in which images are locally stuck and are not separated with the passage of time in a state where the image surfaces are in contact with each other. Moreover, this method is a method including bringing a reaction liquid and an ink into reaction, and fixing the ink. However, the monomer tends to separate, and thus the fixing reaction is also insufficient.

The present invention has been made in view of the above, and particularly aims to provide an ink composition that achieves an excellent effect in terms of ejection stability (recovery from leaving) even in a case in which ejection of the ink composition is stopped, and then after a head is left as it is for a given period of time, the ejection is re-started on an ink-jet recording device, and that has excellent curing properties of image and blocking resistance, an ink set, and an image forming method using the same, and an object of the present invention is to solve the above-described problems.

SUMMARY OF THE INVENTION

According to a first aspect of the present invention, there is provided an ink composition including: a pigment, a water-soluble polymerizable compound (A) having an acrylamide structure in a molecule thereof, a water-soluble solvent (B), and water, in which a mass ratio of the polymerizable compound (A) and the water-soluble solvent (B) satisfies $1/10 \leq B/A \leq 2/3$.

BRIEF DESCRIPTION OF THE DRAWINGS

FIG. 1 is a schematic configuration diagram showing an example of the structure of an ink-jet recording device for carrying out an image forming method of the present invention.

DETAILED DESCRIPTION OF THE INVENTION

Figure 9:
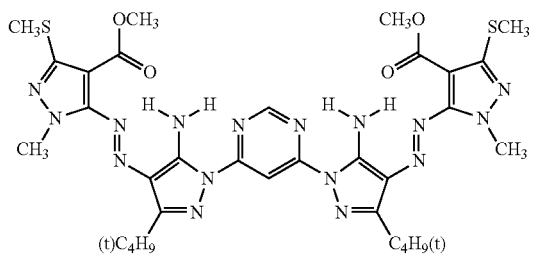
Figure 10:
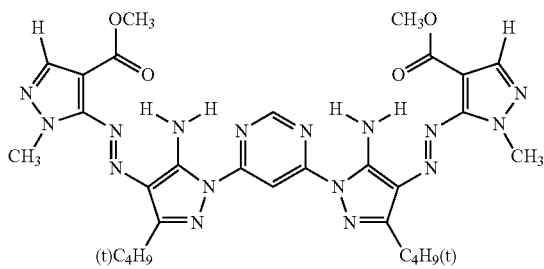
Figure 11:
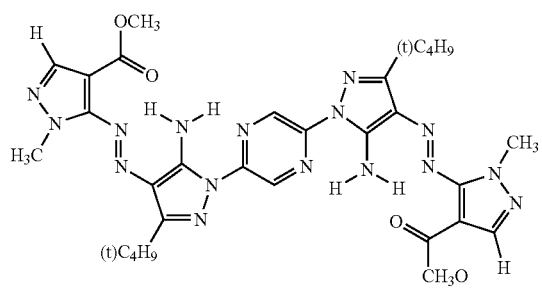
Figure 12:
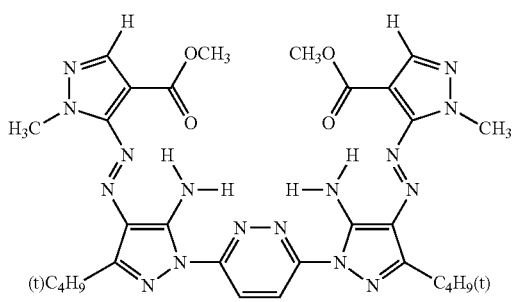
Figure 13:
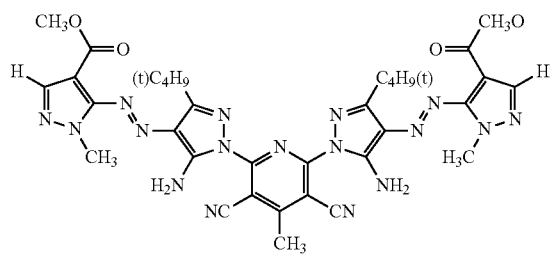
Figure 14:
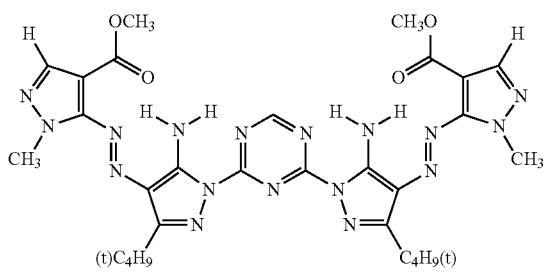
Figure 15:
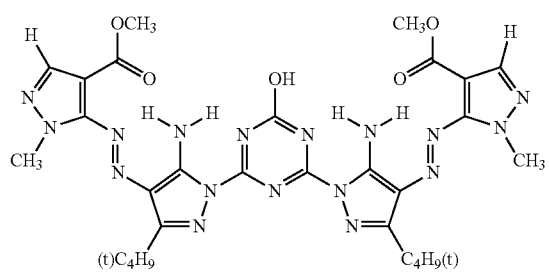
Figure 16:
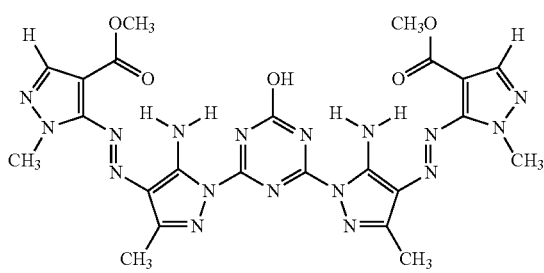
Figure 17:
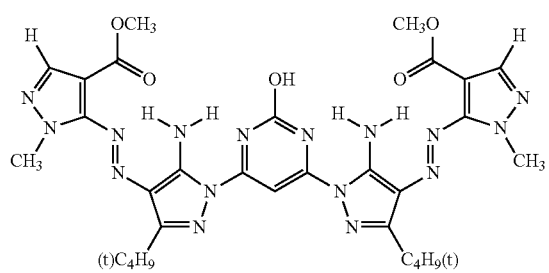
Figure 18:
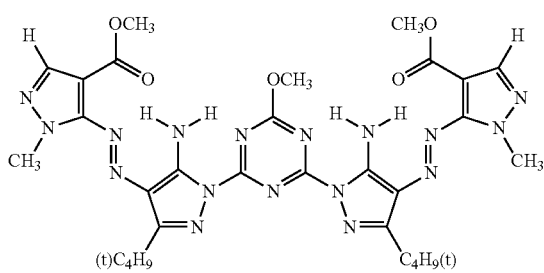
Figure 19:
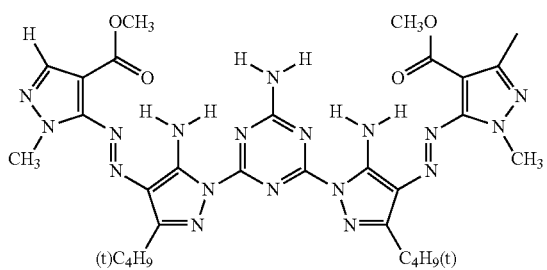
Figure 20:
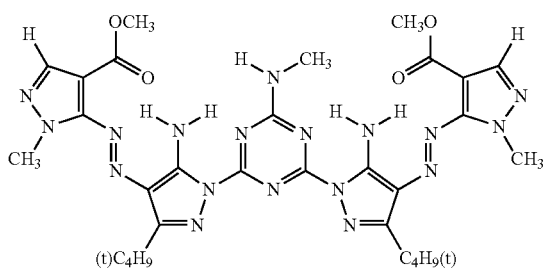
Figure 21:
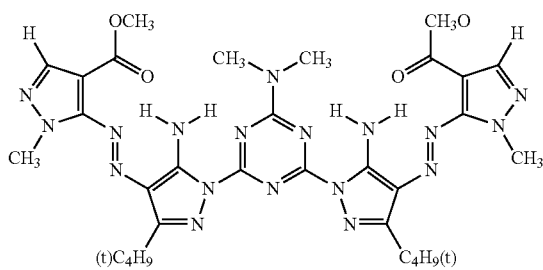
Figure 22:
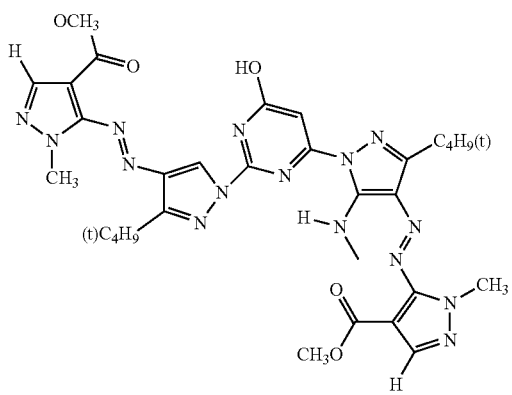
Figure 23:
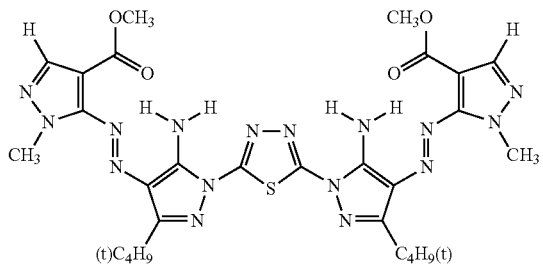
Figure 24:
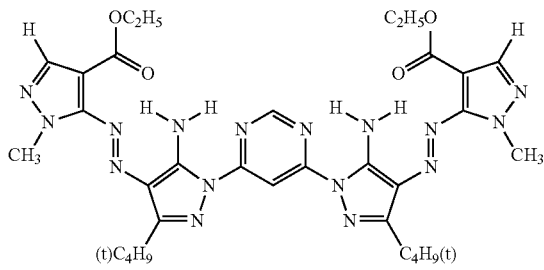
Figure 25:
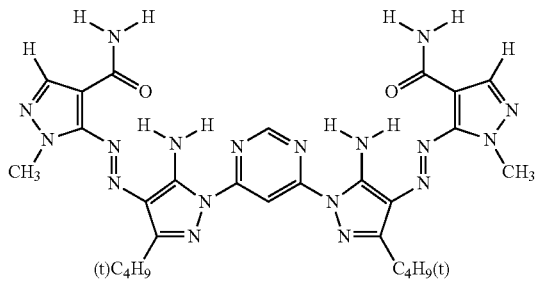
Figure 26:
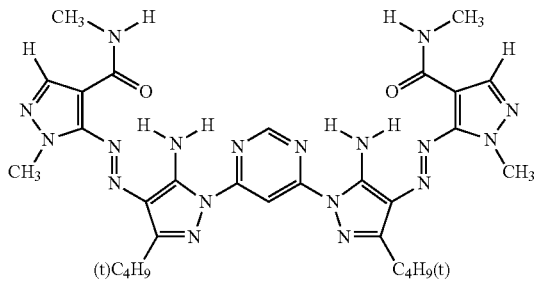
Figure 27:
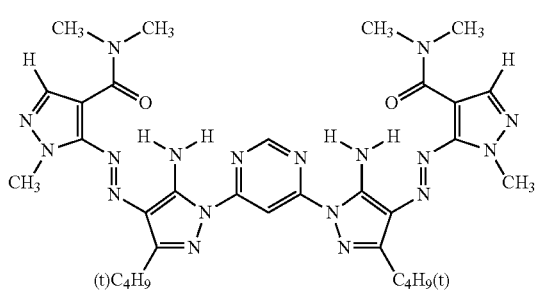
Figure 28:
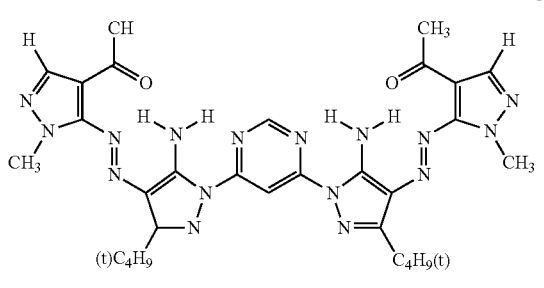
Figure 29:
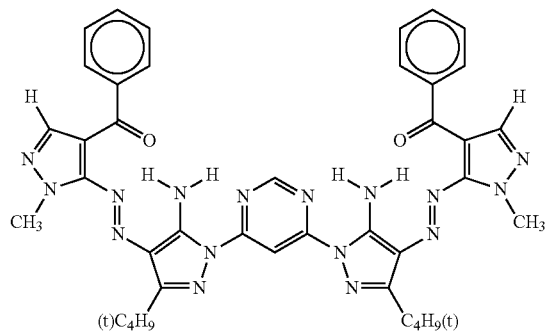
Figure 30:
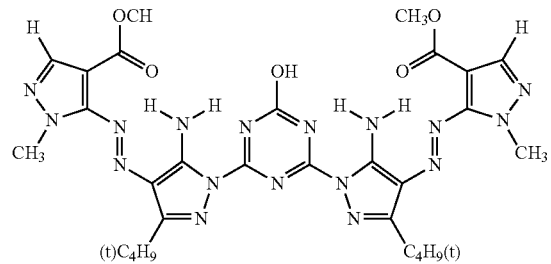
Figure 31:
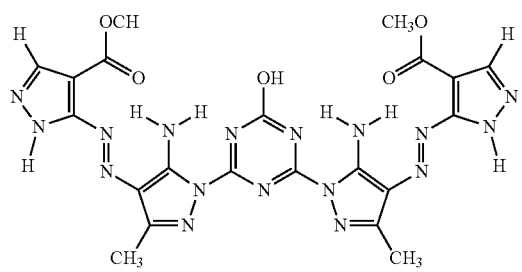
Figure 32:
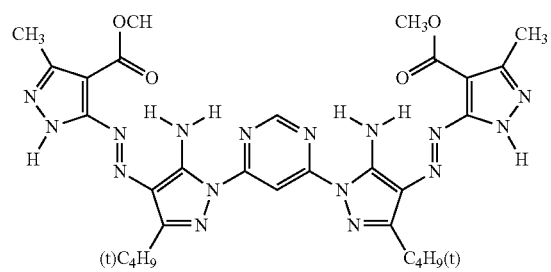
Figure 33:
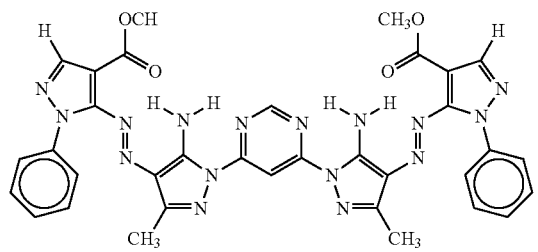
Figure 34:
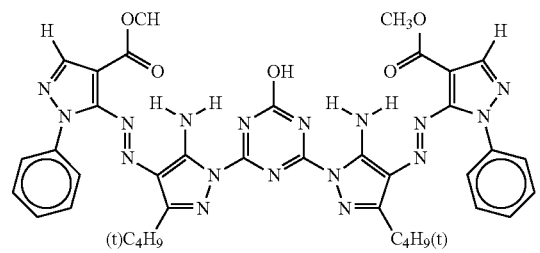
Figure 35:
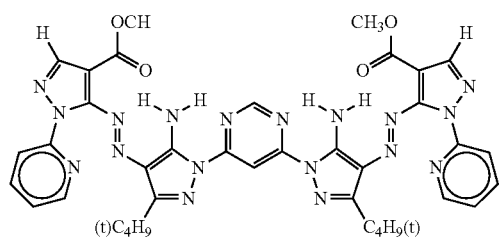
Figure 36:
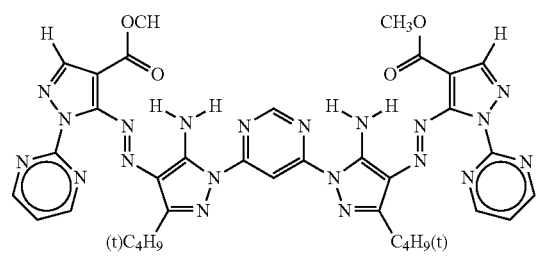
Figure 37:
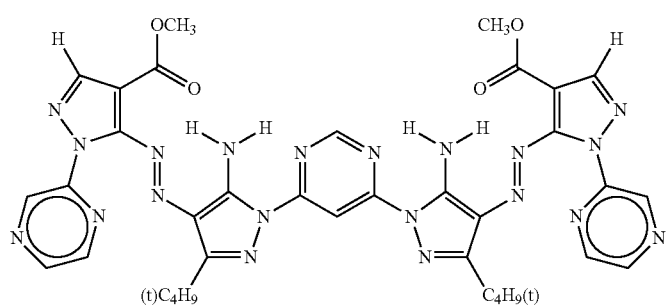

Hereinafter, an ink composition and an ink set of the invention, and an image forming method using the same will be described in detail.

Ink Composition

The ink composition of the invention is a so-called aqueous ink composition containing water as a medium and contains a pigment, a water-soluble polymerizable compound (A) having an acrylamide structure in a molecule thereof, a water-soluble solvent (B), and water, in which a mass ratio of the polymerizable compound (A) and the water-soluble solvent (B) is set to $1/10 \leq B/A \leq 2/3$.

It is presumed that by the use of the specific water-soluble polymerizable compound (A) having an acrylamide structure in a molecule thereof and the water-soluble solvent (B) at a specific mass ratio ($1/10 \leq B/A \leq 2/3$), the polymerization properties of the polymerizable compound (A) are controlled in an appropriate range and in particular, excellent effects are obtained in terms of ejection stability (recovery from leaving) in a case in which ejection of the ink composition is stopped, and then after a head is left as it is for a given period of time, the ejection is re-started on an ink-jet recording device. Furthermore, favorable effects can be also obtained in terms of curing properties of the image and an adhesion phenomenon (blocking) occurring with the passage of time in a state where the image surfaces are in contact with each other.

Polymerizable Compound

The ink composition of the invention contains at least one kind of the water-soluble polymerizable compound (A) having an acrylamide structure in the molecule and polymerizes upon irradiation with active energy rays (e.g., radiation, light, electron beam, or the like). The polymerization and curing of the polymerizable compound strengthens an image portion.

The water solubility refers to that a compound can dissolve in water in a given concentration or higher, and any water-soluble compound may be acceptable insofar as it can dissolve in an aqueous ink (desirably uniformly dissolve). In addition, a compound that dissolves in ink (desirably uniformly dissolve) due to an increase in the water solubility by the addition of a water-soluble solvent described later may be acceptable as a water-soluble compound. Specifically, the solubility in water (25° C.) is preferably 10% by mass or more, and more preferably 15% by mass or more.

Here, the polymerizable compound (A) having an acrylamide structure in a molecule thereof is preferably a compound represented by Formula (1).

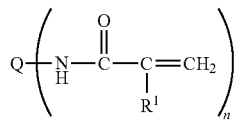

Formula (1)

In Formula (1), Q represents an n-valent linking group; $R^1$ represents a hydrogen atom or a methyl group; and n represents an integer of 1 or more.

The compound of Formula (1) is one in which an unsaturated vinyl monomer is bonded to the linking group Q via an amide linkage. $R^1$ represents a hydrogen atom or a methyl group and is preferably a hydrogen atom. The valence n of the linking group Q is not limited and from the viewpoint of improving the polymerization efficiency and the ejection stability, n is preferably 2 or more, more preferably from 2 to 6, and still more preferably from 2 to 4.

The linking group Q is not particularly limited insofar as it is a group capable of bonding to the acrylamide structure and is preferably selected from a linking group with which the compound represented by Formula (1) satisfies the standard of water solubility described above. Specific examples thereof include a residue in which one or more hydrogen atoms or hydroxyl groups are removed from the following compound group X.

Compound Group X

Polyols, such as ethylene glycol, diethylene glycol, triethylene glycol, polyethylene glycol, propylene glycol, dipropyrene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane; ditrimethylolpropane, trimethylolethane, ditrimethylolethane, neopentylglycol, pentaerythritol, dipentaerythritol and condensates thereof, low molecular weight polyvinyl alcohol, or sugars; and polyamines, such as ethylenediamine, diethylenetriamine, triethylenetetramine, polyethyleneimine, and polypropylenediamine.

Furthermore, examples thereof include substituted or unsubstituted alkylene chains having 4 or less carbon atoms, such as methylene, ethylene, propylene, and butylene groups and functional groups having a saturated or unsaturated heterocyclic group, such as a pyridine ring, an imidazole ring, a pyrazine ring, a piperidine ring, a piperadine ring, and a morpholine ring.

Among the above, the linking group Q is preferably a residue of polyols including an oxyalkylene group (preferably an oxyethylene group) and is particularly preferably a residue of polyols containing three or more oxyalkylene groups (preferably oxyethylene groups).

The water-soluble polymerizable compound (A) having an acrylamide structure in the molecule preferably has an SP value of 9 to 11.5 $(cal/cm^3)^{0.5}$, more preferable an SP value of 9 to 10.5 $(cal/cm^3)^{0.5}$, and still more preferable an SP value of 9 to 10 $(cal/cm^3)^{0.5}$. By adjusting the SP value to the above specific range, the effects of the invention can be more effectively obtained.

Here, the SP value used in the invention will be described.

For the SP value, the Hansen solubility parameter is used. The Hansen solubility parameter is expressed in a three-dimensional space by dividing a solubility parameter introduced by Hildebrand into three components of a dispersion term ($\delta d$), a polarity term ($\delta p$), and a hydrogen-bond term ($\delta h$). In the invention, the SP value is expressed by $\delta[(cal/cm^3)^{0.5}]$ and the value calculated using the following equation is used:

$$\delta[(cal/cm^3)^{0.5}] = (\delta d^2 + \delta p^2 \delta h^2)^{0.5}$$

The values of the dispersion term ($\delta d$), polarity term ($\delta p$), and hydrogen-bond term ($\delta h$) are calculated in many cases by Hansen and his successors, and details are described in Polymer Handbook (fourth edition), VII-698 to 711

Further, the Hansen solubility parameter values of a large number of solvents or resins have been calculated and are described in Industrial Solvents Handbook, authored by Wesley L. Archer.

Specific examples of the water-soluble polymerizable compound (A) having an acrylamide structure in the molecule include the following water-soluble polymerizable compounds.

Polymerizable Compound 1

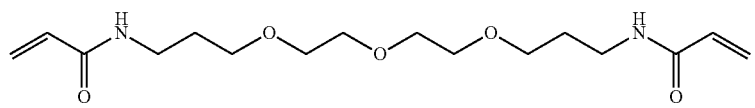

SP value: 9.16 $(cal/cm^3)^{0.5}$

Polymerizable Compound 2

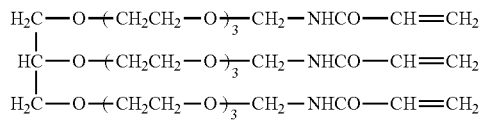

SP value: 9.5 $(cal/cm^3)^{0.5}$

Polymerizable Compound 3

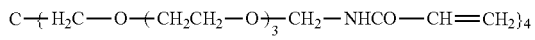

SP value: 9.7 $(cal/cm^3)^{0.5}$

-continued
Polymerizable Compound 4
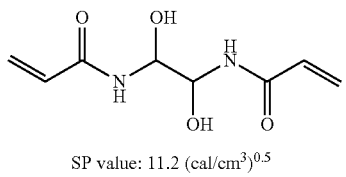
SP value: 11.2 $(cal/cm^3)^{0.5}$
(a)
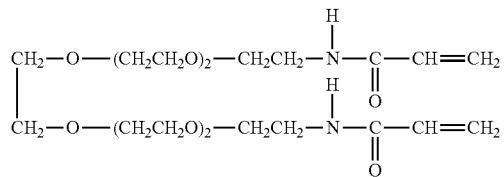
SP value: 9.16 $(cal/cm^3)^{0.5}$
(b)
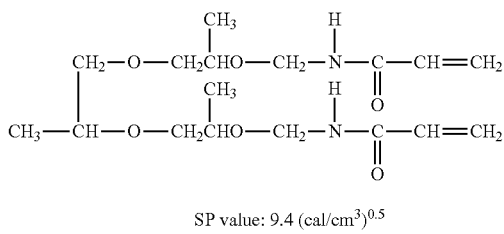
SP value: 9.4 $(cal/cm^3)^{0.5}$
(c)
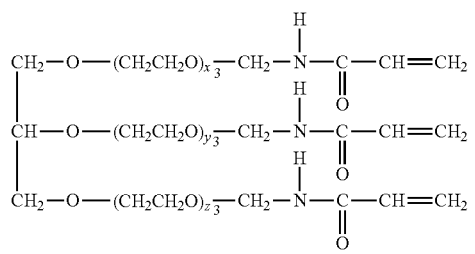
SP value: 9.3 $(cal/cm^3)^{0.5}$    $x_3 + y_3 + z_3 = 6$
(d)
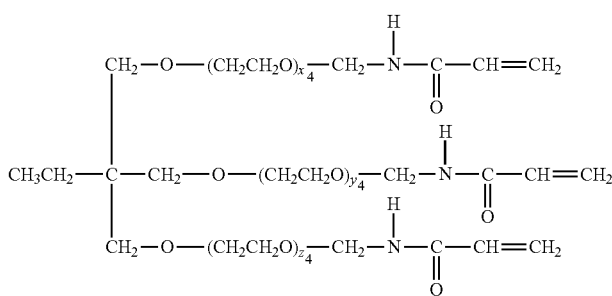
SP value: 9.2 $(cal/cm^3)^{0.5}$    $x_4 + y_4 + z_4 = 9$
(e)
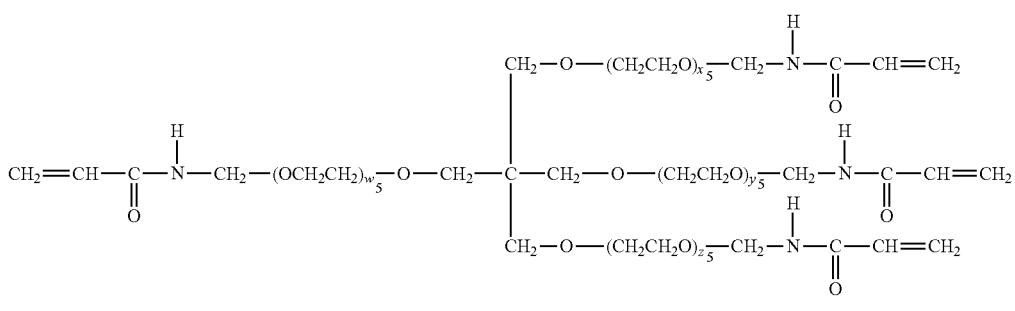
SP value: 9.3 $(cal/cm^3)^{0.5}$    $w_5 + x_5 + y_5 + z_5 = 6$
(f)
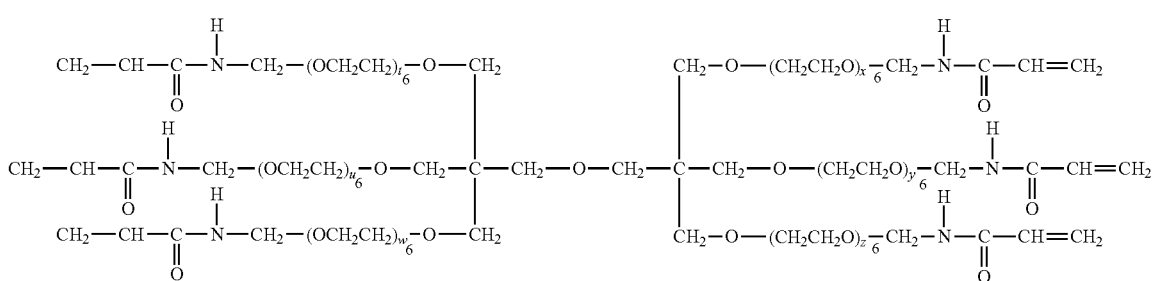
SP value: 9.2 $(cal/cm^3)^{0.5}$    $t_6 + u_6 + w_6 + x_6 + y_6 + z_6 = 12$

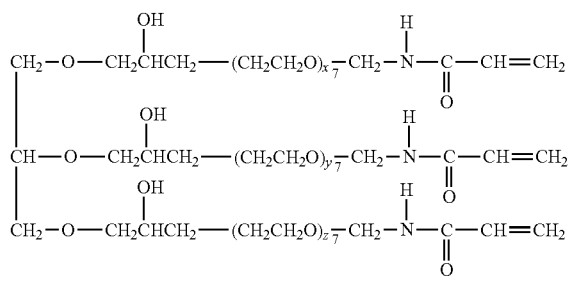

(g)

SP value: 9.7 (cal/cm³)^0.5    $x_7 + y_7 + z_7 = 3$

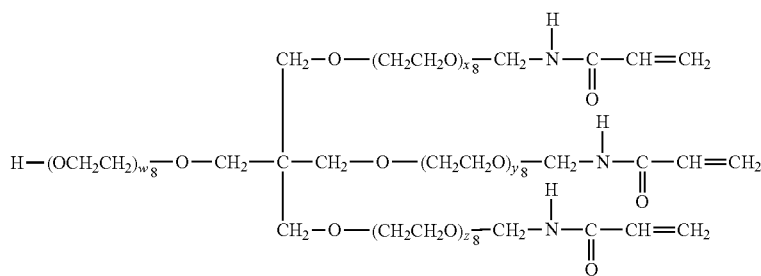

(h)

SP value: 9.5 (cal/cm³)^0.5    $w_8 + x_8 + y_8 + z_8 = 6$

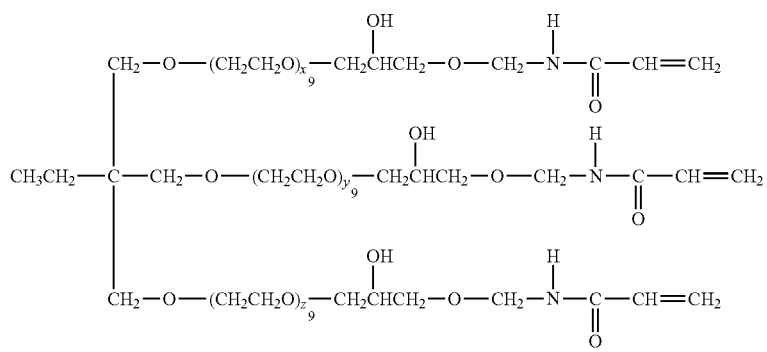

(i)

SP value: 9.4 (cal/cm³)^0.5    $x_9 + y_9 + z_9 = 3$

The polymerizable compound (A) can be contained alone or in combination of two or more kinds thereof.

The content of the polymerizable compound in the ink composition is preferably 200 to 800% by mass and more preferably 250 to 600% by mass relative to the solid of the pigment. When the content of the polymerizable compound is 200% by mass or more relative to the solid content of the pigment, the image intensity further increases and the content of 800 mass or lower is advantageous in the pile height.

Water-Soluble Solvent

The ink composition of the invention contains at least one water-soluble solvent (B). By the water-soluble organic solvent, the effects of dry-preventing, wetting, and promoting penetration into paper can be obtained.

Examples of the water-soluble solvent (B) usable in the invention include the following substances.

Examples include alkanediols (polyhydric alcohols), such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, ethylene glycol mono-iso-propyl ether, ethylene glycol mono-n-butyl ether, ethylene glycol mono-t-butyl ether, diethylene glycol mono-t-butyl ether, and 1-methyl-1-methoxybutanol; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, and sulfolane. One or two or more solvents can be suitably selected from the above solvents for use.

The polyhydric alcohols are also useful as a drying preventing agent or a wetting agent and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These may be used alone or in combination of two or more kinds thereof.

Polyol compounds are also preferable as a penetrating agent and examples of aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. Among the above, preferable examples include 2-ethyl-1,3-hexanediol and 2,2,4-trimethyl-1,3-pentanediol.

The SP value of the water-soluble solvent (B) is preferably in the range of 9 to 13.5 $(cal/cm^3)^{0.5}$ and more preferably in the range of 9 to 12.0 $(cal/cm^3)^{0.5}$. Examples of such a water-soluble solvent include the following water-soluble solvents containing the compound represented by Formula (2) and having an SP value in the range of 9 to 13.5. By adjusting the SP value to the above specific range, the effects of the invention can be more effectively obtained.

For the solubility parameter (SP value) of the water-soluble solvent as used in the invention, the Hansen solubility parameter is used. The detailed definition is synonymous with the SP value in the polymerizable compound described above.

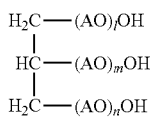

Formula (2)

In Formula (2), l, m, and n each are independently integers of 1 or more and satisfy the relation that l+m+n=3 to 15.

Among the above, l+m+n is preferably 3 to 12 and more preferably 3 to 10.

In Formula (2), AO represents ethyleneoxy and/or propyleneoxy, and particularly a propyleneoxy group is preferable.

Each AO of the $(AO)_l$, $(AO)_m$, and $(AO)_n$ may be the same or different from each other.

Hereinafter, examples of the water-soluble solvent having an SP value in the range of 9 to 13.5 $(cal/cm^3)^{0.5}$ and the compound represented by Formula (2) are shown with the SP value (in the brackets). However, the invention is not limited thereto.

Diethylene glycol monoethyl ether (DEGmEE, 11.0)
Diethylene glycol monobutyl ether (DEGmBE, 10.5)
Triethylene glycol monobutyl ether (TEGmBE, 10.3)
Dipropylene glycol monomethyl ether (DPGmME, 10.4)
Dipropyrene glycol (DPG, 13.3)
Diethylene glycol (DEG, 12.1)
Propylene glycol monoethyl ether (PGmEE, 10.9)
Tripropylene glycol monomethyl ether (TPGmME, 9.43)
Trioxypyrene glycol (12.9)

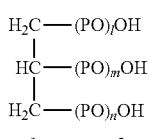

(12.9)

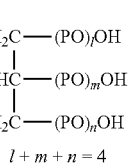

(12.2)

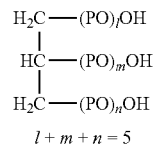

(11.7)

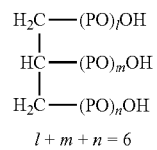

(11.3)

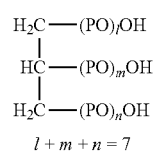

(11.1)

PO=Propyleneoxy
$nC_4H_9O(AO)_4$—H (AO=EO or PO, Ratio of EO:PO=1:1) (9.8)
$nC_4H_9O(AO)_{10}$—H (AO=EO or PO, Ratio of EO:PO=1:1) (9.2)
$HO(A'O)_{40}$—H (A"O=EO or PO, Ratio of EO:PO=1:3) (9.2)
$HO(A"O)_{55}$—H (A"O=EO or PO, Ratio of EO:PO=5:6) (9.8)
$HO(PO)_3$—H (12.1)
$HO(PO)_7$—H (10.5)
1,2-hexanediol (13.4)

In the invention, EO and PO represent an ethylene oxy group and a propylene oxy group, respectively.

The water-soluble solvents having an SP value in the range of 9 to 13.5 $(cal/cm^3)^{0.5}$ described above may be used alone or as a mixture of two or more kinds thereof. In addition, other solvents having an SP value outside the range of 9 to 13.5 $(cal/cm^3)^{0.5}$ can also be used in combination. When the other solvents having an SP value outside the range of 9 to 13.5 $(cal/cm^3)^{0.5}$ are used in combination, the content of the other solvents having an SP value outside the range of 9 to 13.5 $(cal/cm^3)^{0.5}$ is preferably within 10% by mass relative to the entire solvent.

Moreover, so-called solid wetting agents, such as: sugars, such as glucose, mannose, fructose, ribose, xylose, arabinose, galactose, aldonic acid, glucitol, maltose, cellobiose, lactose, sucrose, trehalose, and maltotriose; sugar alcohols; hyaluronic acids; and ureas, are preferably used in combination.

The content of the water-soluble solvent is preferably from 1% by mass to 30% by mass, more preferably from 5% by mass to 20% by mass, and particularly preferably from 7% by mass to 15% by mass relative to the entire ink composition from the viewpoint of securing stability and ejection reliability.

In the ink composition of the invention, by adjusting a mass ratio of the water-soluble polymerizable compound (A) having an acrylamide structure in the molecule described above and the water-soluble solvent (B) to $1/10 \leq B/A \leq 2/3$, preferably $1/10 \leq B/A \leq 3/5$, and more preferably $1/5 \leq B/A \leq 5/9$, excellent effects are obtained in the ejection stability (recovery from leaving) even in a case in which ejection of the ink composition is stopped, and then after a head is left as it is for a given period of time, the ejection is re-started on an ink-jet recording device and, in addition, excellent effects are obtained in terms of curing properties of the image and blocking resistance.

When B/A is smaller than 1/10, instability of ejectability due to drying of the head is likely to occur. When B/A becomes larger than 2/3, an adhesion phenomenon (blocking) occurring with the passage of time in a state where the image surfaces are in contact with each other becomes significantly worse.

Pigment

The ink composition in the present invention includes at least one pigment as a colorant component. The pigment is not particularly limited, and may be selected appropriately according to the purpose. For example, the pigment may be an organic pigment or an inorganic pigment. The pigment is preferably almost completely insoluble in water or hardly-soluble in water, in consideration of ink coloring properties.

Examples of the organic pigment include azo pigments, polycyclic pigments, dye chelates, nitro pigments, nitroso pigments, and aniline black. Among these, azo pigments and polycyclic pigments are preferable.

Examples of the inorganic pigment include titanium oxide, iron oxide, calcium carbonate, barium sulfate, aluminum hydroxide, barium yellow, cadmium red, chromium yellow, and carbon black. Among these, carbon black is preferable.

Among the organic pigments, examples of organic pigments for orange or yellow include C.I. pigment orange 31, C.I. pigment orange 43, C.I. pigment yellow 12, C.I. pigment yellow 13, C.I. pigment yellow 14, C.I. pigment yellow 15, C.I. pigment yellow 17, C.I. pigment yellow 74, C.I. pigment yellow 93, C.I. pigment yellow 94, C.I. pigment yellow 128, C.I. pigment yellow 138, C.I. pigment yellow 151, C.I. pigment yellow 155, C.I. pigment yellow 180, and C.I. pigment yellow 185. Examples of organic pigments for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19. Examples of organic pigments for green or cyan include C.I. pigment blue 15, C.I. pigment blue 15:2, C.I. pigment blue 15:3, C.I. pigment blue 15:4, C.I. pigment blue 16, C.I. pigment blue 60, C.I. pigment green 7, and siloxane-crosslinked aluminum phthalocyanine described in U.S. Pat. No. 4,311,775. Examples of organic pigments for black include C.I. pigment black 1, C.I. pigment black 6, and C.I. pigment black 7.

Preferable examples of the azo pigment include the pigments represented by Formula (3) and a tautomer thereof. Hereinafter, the azo pigment represented by Formula (3) will be described.

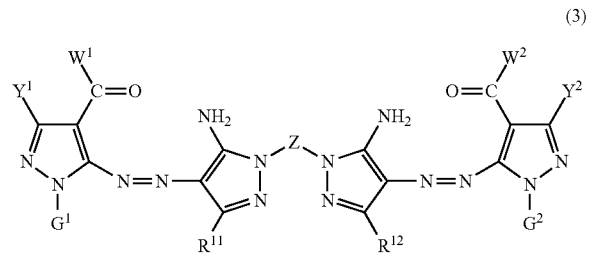

(3)

The compounds represented by Formula (3) are likely to form an intermolecular interaction due to the specific structure, and has low solubility with respect to water or organic solvents, whereby the compounds can be used as azo pigments.

Unlike dyes that are dissolved in water, organic solvents, or the like in a molecular dispersion state for use, the above azo pigments are finely dispersed in a solvent as solid particles, such as an aggregate of molecules, for use.

In Formula (3), Z represents a divalent group derived from a 5-to 8-membered nitrogen-containing heterocyclic ring, $Y^1$, $Y^2$, $R^{11}$, and $R^{12}$ each independently represent a hydrogen atom or a substituent, $G^1$ and $G^2$ each independently represent a hydrogen atom, an alkyl group, a cycloalkyl group, an aralkyl group, an alkenyl group, an alkynyl group, an aryl group, or a heterocyclic group, and $W^1$ and $W^2$ each independently represent an alkoxy group, an amino group, an alkyl group, or an aryl group.

In Formula (3), Z represents a divalent group derived from a 5-to 8-membered nitrogen-containing heterocyclic ring. Preferable examples of the nitrogen-containing heterocyclic ring without limiting the substitution position, a pyrrole ring, a pyrazole ring, a triazole ring, an imidazole ring, a thiazole ring, an isothiazole ring, an oxazole ring, an isooxazole ring, a thiadiazole ring, a thiophen ring, a furan ring, a pyridine ring, a pyrimidine ring, a triazine ring, and a pyridazine ring. A 6-membered nitrogen-containing heterocyclic ring is more preferable, and examples include a pyridine ring, a pyrimidine ring, and an s-triazine ring. Particularly preferable examples of Z include a divalent group derived from a pyrimidine ring.

The case where Z is a 6-membered nitrogen-containing heterocyclic ring is preferable in that the intramolecular or intermolecular action of dye molecules further easily increases also in terms of hydrogen bonding properties and flatness of the molecule.

The divalent group derived from the 5-to 8-membered nitrogen-containing heterocyclic ring represented by Z may be further condensed.

When $Y^1$ and $Y^2$ represent a substituent, examples of the substituent include a halogen atom and an alkyl group (which is a straight-chain, branched-chain, or cyclic substituted or unsubstituted alkyl group and also includes a cycloalkyl group, a bicycloalkyl group, and a tricyclo structure having many ring structures; The alkyl group in substituents described below (e.g., an alkyl group in an alkoxy group, an alkyl carbonyl group, or an alkyl sulfonyl group) also represents the alkyl group having such a concept.), an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonyl amino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic-azo group, an imide group, a phosphino group, a phosphinyl group, a phosphinyloxy group, a phosphinylamino group, and a silyl group.

$Y^1$ and $Y^2$ are particularly preferably a hydrogen atom, an alkyl group (e.g., a methyl group), an aryl group (e.g., a phenyl group), a heterocyclic group (e.g., a 2-pyridyl group), and an alkyl thio group (e.g., a methyl thio group) and still more preferably a hydrogen atom, a methyl group, a phenyl group, and a methyl thio group. Among the above, a hydrogen atom is most preferable. $Y^1$ and $Y^2$ may be the same or different.

In Formula (3), $R^{11}$ and $R^{12}$ represent a hydrogen atom or a substituent. When $R^{11}$ and $R^{12}$ represent a substituent, examples of the substituent include a straight or branched chain alkyl group having 1 to 12 carbon atoms (e.g., methyl, ethyl, n-propyl, i-propyl, n-butyl, i-butyl, sec-butyl, t-butyl, 2-ethylhexyl, 2-methyl sulfonyl ethyl, 3-phenoxy propyl, and trifluoro methyl), a straight or branched chain aralkyl group having 7 to 18 carbon atoms (e.g., benzyl), a straight or branched chain alkenyl group having 2 to 12 carbon atoms (e.g., vinyl), a straight or branched chain alkynyl group (e.g., ethinyl), a straight or branched chain cycloalkyl group of having 3 to 12 carbon atoms (e.g., cyclopentyl), a straight or branched chain cycloalkenyl group having 3 to 12 carbon atoms (e.g., cyclopentenyl), halogen atoms (e.g., chlorine and bromine), an aryl group (e.g., phenyl, 4-t-butylphenyl, and 2,4-di-t-amylphenyl), a heterocyclic group (e.g., imidazolyl, pyrazolyl, triazolyl, 2-furyl, 2-thienyl, 2-pyrimidinyl, and 2-benzothiazolyl), a cyano group, a hydroxyl group, a nitro group, a carboxyl group, an amino group, an alkyloxy group (e.g., methoxy, ethoxy, 2-methoxy ethoxy, and 2-methyl sulfonyl ethoxy), an aryloxy group (e.g., phenoxy, 2-methylphenoxy, 4-t-butylphenoxy, 3-nitrophenoxy, 3-t-butyloxy carbonyl phenoxy, 3-methoxy carbonyl phenyloxy, an acyl amino group (e.g., acetamide, benzamide, and 4-(3-t-butyl 4-hydroxy phenoxy)butane amide), an alkylamino group (e.g., methylamino, butylamino, diethylamino, and methylbutylamino), an arylamino group (e.g., phenylamino and 2-chloroanilino), a ureido group (e.g., phenylureido, methylureido, and N,N-dibutylureido), a sulfamoyl amino group (e.g., N,N-dipropyl sulfamoyl amino), an alkylthio group (e.g., methylthio, octhylthio, and 2-phenoxyethylthio), an arylthio group (e.g., pheylthio, 2-butoxy-5-t-octylpheylthio, and 2-carboxypheylthio), an alkyloxy carbonyl amino group (e.g., methoxy carbonyl amino), an alkylsulfonylamino group and an arylsulfonylamino group (e.g., methylsulfonylamino, phenylslufonylamino, and p-toluenesulfonylamino), a carbamoyl group (e.g., N-ethyl carbamoyl and N, N-dibutylcarbamoyl), a sulfamoyl group (e.g., N-ethylsulfamoyl, N,N-dipropylsulfamoyl, and N-phenylsulfamoyl), a sulfonyl group (e.g., methylsulfonyl, octylsulfonyl, phenylslufonyl, and p-toluenesulfonyl), an alkyloxycarbonyl group (e.g., methoxycarbonyl and butyloxycarbonyl), a heterocyclic oxy group (e.g., a 1-phenyl tetrazol-5-oxy and 2-tetrahydropyranyloxy), an azo group (e.g., phenylazo, 4-methoxyphenylazo, 4-pivaloylaminophenylazo, and 2-hydroxy-4-propanoylphenylazo), an acyloxy group (e.g., acetoxy), a carbamoyloxy group (e.g., N-methylcarbamoyloxy and N-phenylcarbamoyloxy), a silyloxy group (e.g., trimethylsilyloxy and dibutylmethylsilyloxy), an aryloxycarbonylamino group (e.g., phenoxycarbonylamino), an imido group (e.g., N-succinimido and N-phthalimido), a heterocyclic thio group (e.g., 2-benzothiazolylthio, 2,4-di-phenoxy-1,3,5-triazole-6-thio, and 2-pyridylthio), a sulfinyl group (e.g., 3-phenoxypropylsulfinyl), a phosphonyl group (e.g., phenoxyphosphonyl, octyloxyphosphonyl, and phenylphosphonyl), an aryloxycarbonyl group (e.g., phenoxycarbonyl), an acyl group (e.g., acetyl, 3-phenylpropanoyl, and benzoyl), and an ionic hydrophilic group (e.g., a carboxyl group, a sulfo group, a phosphono group, and a quaternary ammonium group).

In Formula (3), $R^{11}$ and $R^{12}$ each are preferably a substituted or unsubstituted acylamino group having a total number of carbon atoms of 1 to 8, a substituted or unsubstituted alkyl group having a total number of carbon atoms of 1 to 12, a substituted or unsubstituted aryl group having a total number of carbon atoms of 6 to 18, or a substituted or unsubstituted heterocyclic group having a total number of carbon atoms of 4 to 12, more preferably a straight chain alkyl group or a branched chain alkyl group having a total number of carbon atoms of 1 to 8, still more preferably a methyl group or a t-butyl group, and most preferably a t-butyl group among the above.

By using a straight chain alkyl group or a branched chain alkyl group having a small total number of carbon atoms (e.g., number of carbon atoms of 1 to 4) for $R^{11}$ and $R^{12}$, more excellent hue, coloring strength, and image fastness can be achieved.

$R^{11}$ and $R^{12}$ may be the same or different.

$G^1$ and $G^2$ represent a hydrogen atom, an alkyl group, a cycloalkyl group, an aralkyl group, an alkenyl group, an alkynyl group, an aryl group, or a heterocyclic group, paritcularly preferably a hydrogen atom, a methyl group, an ethyl group, an n-propyl group, an i-propyl group, a t-butyl group, a cyclo propyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group, and still more preferably a hydrogen atom, a methyl group, a phenyl group, a pyridyl group, a pyrimidinyl group, and a pyrazinyl group. Among the above, a methyl group, 2-pyridyl group, 2,6-pyrimidinyl group, and 2,5-pyrazinyl group are preferable.

When $G^1$ and $G^2$ represent an alkyl group, an alkyl group having a total number of carbon atoms of 5 or lower is preferable, an alkyl group having a total number of carbon atoms of 3 or lower is more preferable, and a methyl group is most preferable. $G^1$ and $G^2$ may be the same or different.

In Formula (3), $W^1$ and $W^2$ represent an alkoxy group, an amino group, an alkyl group, or an aryl group.

The alkoxy group represented by $W^1$ and $W^2$ is preferably a substituted or unsubstituted alkoxy group having 1 to 30 carbon atoms and particularly preferably a substituted or unsubstituted alkoxy group of having 1 to 5 carbon atoms. Examples include a methoxy group, an ethoxy group, a i-propoxy group, a t-butoxy group, an n-octyloxy group, and a 2-methoxy ethoxy group.

Examples of the amino group represented by $W^1$ and $W^2$ include an alkylamino group, an arylamino group, and a heterocyclic amino group. Preferable examples include an amino group, a substituted or unsubstituted alkylamino group having 1 to 30 carbon atoms, and a substituted or unsubstituted anilino group having 6 to 30 carbon atoms. Among the above, an amino group, a substituted or unsubstituted alkylamino group having 1 to 8 carbon atoms, and a substituted or unsubstituted anilino group having 6 to 18 carbon atoms are preferable and an amino group, a substituted or unsubstituted alkylamino group having 1 to 4 carbon atoms, and a substituted or unsubstituted anilino group having 6 to 12 carbon atoms are more preferable. Examples of the amino group include an amino group (—$NH_2$), a methylamino group (—$NHCH_3$), a dimethylamino group {—$N(CH_3)_2$}, an anilino group (—NHPh), an N-methylanilino group {—N($CH_3$)Ph}, and a diphenylamino group {—$N(Ph)_2$}.

Examples of the alkyl group represented by $W^1$ and $W^2$ each independently include a straight chain, branched chain, or cyclic substituted or unsubstituted alkyl group and also includes a cycloalkyl group, a bicycloalkyl group, and a tricyclo structure having a large number of ring structures.

Specific preferable examples of the alkyl group include an alkyl group having 1 to 30 carbon atoms, such as a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. Preferable examples of the cycloalkyl group include a substituted or unsubstituted cycloalkyl group having 3 to 30 carbon atoms, such as a cyclohexyl group, a cyclopentyl group, and a 4-n-dodecylcyclohexyl group. Specific examples of the bicycloalkyl group include a substituted or unsubstituted bicycloalkyl group having 5 to 30 carbon atoms, i.e., a monovalent group in which one hydrogen atom is removed from bicycloalkane having 5 to 30 carbon atoms, such as a bicyclo[1.2.2]heptane-2-yl group and a bicyclo[2.2.2]octane-3-yl group.

Preferable examples of the aryl group represented by $W^1$ and $W^2$ include a substituted or unsubstituted aryl group having 6 to 30 carbon atoms. Among the above, a substituted or unsubstituted aryl group having 6 to 18 carbon atoms is preferable and a substituted or unsubstituted aryl group having 6 to 12 carbon atoms is more preferable. Examples of the aryl group include a phenyl group, a p-tolyl group, a naphthyl group, an m-chlorophenyl group, and an o-hexadecanoylaminophenyl group.

Among the above, $W^1$ and $W^2$ each are preferably an alkoxy group (e.g., a methoxy group, an ethoxy group, an i-propoxy group, and a t-butoxy group), an amino group (e.g., a —$NH_2$ group, a methylamino group, a dimethylamino group, and an anilino group), an alkyl group (e.g., a methyl group, an ethyl group, an n-propyl group, an i-propyl group, a t-butyl group, and a cyclo propyl group), or an aryl group (e.g., a phenyl group, a p-tolyl group, and a naphthyl group). Among the above, an alkoxy group, an amino group, a phenyl group, or an alkyl group is preferable and an alkoxy group and an amino group are more preferable.

$W^1$ and $W^2$ each are more preferably an alkoxy group having a total number of carbon atoms of 5 or lower, an amino group (a —$NH_2$ group), and an alkylamino group having a total number of carbon atoms of 5 or lower. The embodiments that $W^1$ and $W^2$ each independently represent an alkoxy group having a total number of carbon atoms of 5 or lower, an amino group, and an alkylamino group having a total number of carbon atoms of 5 or lower are preferable in that dye molecules are easy to form rigidly a hydrogen bond at least one of in a molecule or between molecules and an excellent hue and a high fastness (e.g., light fastness, gas resistance, heat resistance, water resistance, and chemical resistance) are achieved.

In terms of hue, light fastness, and solvent resistance, an alkoxy group having a total number of carbon atoms of 3 or lower, an amino group (a —$NH_2$ group), and an alkylamino group having a total number of carbon atoms of 3 or lower are particularly preferable. Among the above, a methoxy group (a —$OCH_3$ group) or an ethoxy group (a —$OC_2H_5$ group) is preferable and a methoxy group is particularly preferable from the viewpoint of excellent hue and improvement of light fastness.

$W^1$ and $W^2$ may be the same or different.

In the present invention, when Z, $Y^1$, $Y^2$, $R^{11}$, $R^{12}$, $G^1$, $G^2$, $W^1$, and $W^2$ further have a substituent, examples include the following substituents.

Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxy carbonyloxy group, an amino group, an acylamino group, an aminocarbonylamino group, an alkoxycarbonylamino group, an aryloxycarbonylamino group, a sulfamoylamino group, an alkyl- or an aryl-sulfonylamino group, a mercapto group, an alkylthio group, an arylthio group, a heterocyclic thio group, a sulfamoyl group, an alkyl- or arylsulfinyl group, an alkyl- or aryl-sulfonyl group, an acyl group, an aryloxycarbonyl group, an alkoxycarbonyl group, a carbamoyl group, an aryl- or heterocyclic-azo group, an imide group, a phosphino group, a phosphinyl group, a phosphinyloxy group, a phosphinylamino group, and a silyl group.

The azo pigment in the present invention also includes tautomers of the azo pigments represented by Formula (3) in the scope thereof. Although Formula (3) is shown in the form of a limiting structure among possible various kinds of tautomers in terms of a chemical structure, tautomers having structures other than the shown structure may be acceptable and a mixture containing a plurality of tautomers may be used.

For example, azo-hydrazone tautomers of the azo pigments represented by Formula (3) may be represented by Formula (3').

The invention also includes the compounds represented by Formula (3'), which are tautomers of the azo pigments represented by Formula (3), in the scope.

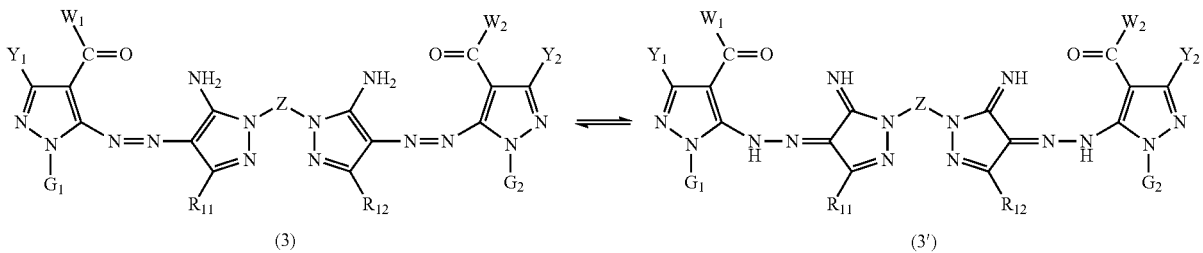

(3)

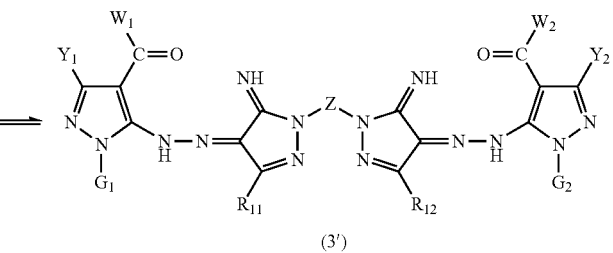

(3')

In Formula (3') $R^{11}$, $R^{12}$, $W^1$, $W^2$, $Y^1$, $Y^2$, $G^1$, $G^2$, and Z are the same as $R^{11}$, $R^{12}$, $W^1$, $W^2$, $Y^1$, $Y^2$, $G^1$, $G^2$, and Z, respectively, in Formula (3).

With respect to a preferable combination of the substituents in the compounds represented by Formula (3), compounds are preferable in which at least one of the various substituents is the preferable group mentioned above, compounds are more preferable in which a large number of the various substituents are the preferable groups mentioned above, and compounds are the most preferable in which all of the substituents are the preferable groups mentioned above.

Particularly preferable combinations of the groups in the azo pigments represented by Formula (3) of the present invention include at least one of the following (a) to (e).

(a) $W^1$ and $W^2$ each independently preferably represent an alkoxy group (e.g., methoxy, ethoxy, i-propoxy, and t-butoxy), an amino group (e.g., —$NH_2$, methylamino, dimethylamino, and anilino), an alkyl group (e.g., methyl, ethyl, n-propyl, i-propyl, t-butyl, and cyclopropyl), or an aryl group (e.g., phenyl, p-tolyl, and naphthyl). Among the above, an alkoxy group, an amino group, or an alkyl group is preferable, an alkoxy group or an amino group is more preferable, an alkoxy group having a total number of carbon atoms of 5 or lower, an amino group (—NH$_2$), and an alkylamino group having a total number of carbon atoms of 5 or lower are still more preferable, and an alkoxy group having a total number of carbon atoms of 3 or lower, an amino group (—NH$_2$), and an alkylamino group having a total number of carbon atoms of 3 or lower are particularly preferable. Among the above, a methoxy group (—OCH$_3$) is the most preferable.

(b) $R^{11}$ and $R^{12}$ each independently represent a hydrogen atom or a substituent (e.g., a substituted or unsubstituted acylamino group having a total number of carbon atoms of 1 to 8, a substituted or unsubstituted alkyl group having a total number of carbon atoms of 1 to 12, a substituted or unsubstituted aryl group having a total number of carbon atoms of 6 to 18, or a substituted or unsubstituted heterocyclic group having a total number of carbon atoms of 4 to 12), more preferably a straight or branched chain alkyl group having a total number of carbon atoms of 1 to 8, and still more preferably a methyl group, an iso-propyl group, or a tert-butyl group with a tert-butyl group being the most preferable among the above.

(c) Z represents a divalent group derived from a 5- to 8-membered nitrogen-containing heterocyclic group and the divalent group may be further fused. Examples of the nitrogen-containing heterocyclic group include a 5- or 6-membered substituted or unsubstituted nitrogen-containing heterocyclic group, such as a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring, and a pyrazine ring, and a 6-membered nitrogen-containing heterocyclic group having 3 to 10 carbon atoms are particularly preferable. Examples of a more preferable heterocyclic group include a pyridine ring, a pyrimidine ring, an s-triazine ring, a pyridazine ring, and a pyrazine ring. A pyrimidine ring and an s-triazine ring are still more preferable, and a pyrimidine ring is most preferable among the above.

(d) $G^1$ and $G^2$ each independently represent a hydrogen atom, an alkyl group, a cycloalkyl group, an aralkyl group, an alkenyl group, an alkynyl group, an aryl group, or a heterocyclic group. A hydrogen atom, a methyl group, an ethyl group, an n-propyl group, an iso-propyl group, a t-butyl group, a cyclopropyl group, a benzyl group, 2-phenethyl group, a vinyl group, an allyl group, an ethynyl group, a propargyl group, a phenyl group, p-tolyl group, a naphthyl group, a pyridyl group, a pyrimidinyl group, and a pyrazinyl group are particularly preferable and a hydrogen atom, a methyl group, a phenyl group, a pyridyl group, a pyrimidinyl group, and a pyrazinyl group are still more preferable. Among the above, a methyl group, a 2-pyridyl group, a 2,6-pyrimidinyl group, and a 2,5-pyrazinyl group are preferable.

The alkyl group represented by $G^1$ and $G^2$ is more preferably an alkyl group having a total number of carbon atoms of 5 or lower, still more preferably an alkyl group having a total number of carbon atoms of 3 or lower, and most preferably a methyl group.

(e) $Y^1$ and $Y^2$ each independently represents a hydrogen atom, an alkyl group (e.g., methyl), an aryl group (e.g., phenyl), a heterocyclic group (e.g., 2-pyridyl), or an alkylthio group (e.g., methylthio). A hydrogen atom, a methyl group, a phenyl group, and a methylthio group are preferable, and, among the above, a hydrogen atom is particularly preferable.

Among the azo pigments represented by Formula (3) used in the present invention, the azo pigments represented by Formula (4) are preferable.

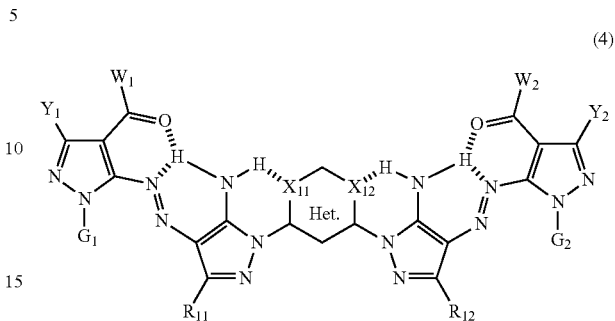

(4)

$G^1$, $G^2$, $R^{11}$, $R^{12}$, $W^1$, $W^2$, $Y^1$, and $Y^2$ in Formula (4) are the same as $G^1$, $G^2$, $R^{11}$, $R^{12}$, $W^1$, $W^2$, $Y^1$, and $Y^2$ respectively, in Formula (3).

$X^{11}$ and $X^{12}$ each independently represent a hetero atom in a divalent group (Het.) derived from the nitrogen-containing heterocyclic compound represented by Z in Formula (3).

In the present invention, the azo pigments represented by Formula (3) may have a large number of tautomers.

The azo pigments represented by Formula (3) in the present invention preferably have substituents capable of forming intramolecular hydrogen bonds or intramolecular cross hydrogen bonds. The azo pigments represented by Formula (3) in the invention preferably have substituents capable of forming at least one intramolecular cross hydrogen bond, more preferably have substituents capable of forming at least three intramolecular hydrogen bonds, and particularly preferably have substituents capable of forming at least three intramolecular hydrogen bonds wherein at least two hydrogen bonds of the at least three intramolecular hydrogen bonds are intramolecular cross hydrogen bonds.

Among the azo pigments represented by Formula (3), examples of the particularly preferable azo pigments include the azo pigments represented by Formula (4) as described above.

A factor for the fact that the structure is preferable resides in that, for example, as shown in Formula (4), the nitrogen atom, the hydrogen atom, and the hetero atom (a nitrogen atom of an azo group or a hydrazone group which is a tautomer thereof and an oxygen atom of a carbonyl group or a nitrogen atom of an amino group) constituting the heterocyclic ring contained in the azo pigment structure easily form at least one intramolecular cross hydrogen bond (intramolecular hydrogen bond).

A factor for the fact that the structures are preferable resides in that, for example, as shown in Formula (4), the nitrogen atom, and the hydrogen atom and the hetero atom of an amino group (e.g., nitrogen atom of an azo group or a hydrazone group which is a tautomer thereof and an oxygen atom of a carbonyl group or a nitrogen atom of an amino group) constituting the heterocyclic group contained in the azo pigment easily form at least four intramolecular hydrogen bonds and easily form at least two intramolecular cross hydrogen bonds.

As a result, the flatness of the molecule is increased, the intramolecular/intermolecular interaction is improved, the crystallinity of the azo pigments represented by, for example, Formula (4) becomes high (easily forms a high order structure), and light fastness, thermal stability, wet heat stability, water resistance, gas resistance and/or solvent resistance, which are properties required as pigments, are conspicuously increased. Thus, the above structure is the most preferable example.

The azo pigment used in the present invention may contain isotopes (e.g., $^2H$, $^3H$, $^{13}C$, and $^{15}N$) in the compounds represented by Formula (3).

Specific examples (Exemplified Compounds Pig.-1 to Pig.-48) of the azo pigments represented by Formula (3) are shown below. However, the invention is not limited to these examples. The structures of the following specific examples are represented in the form of a limiting structure among various kinds of possible tautomers in the chemical structure. However, it is a matter of course that tautomer structures other than the shown structures may be acceptable.

Pig.-1

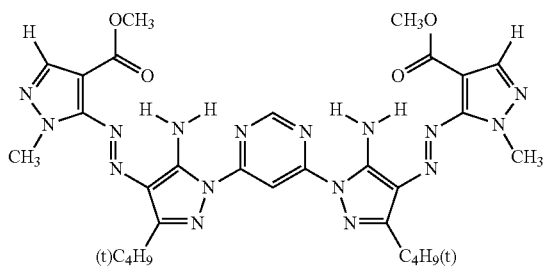

Pig.-2

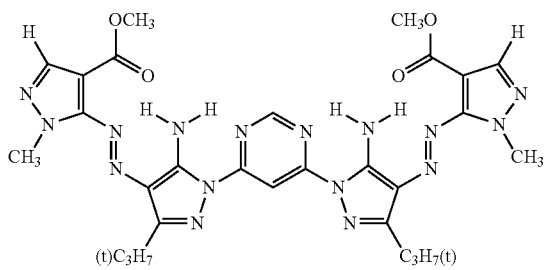

Pig.-3

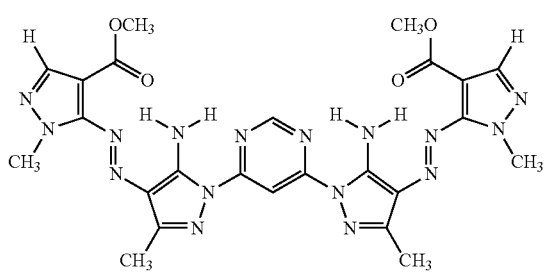

Pig.-4

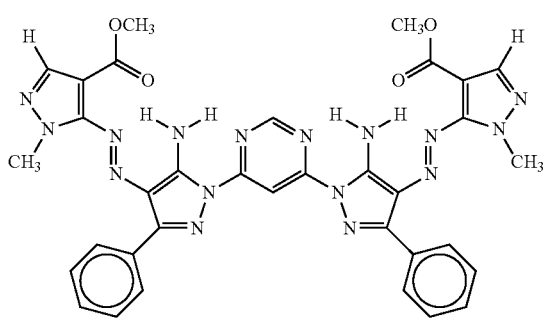

Pig.-5

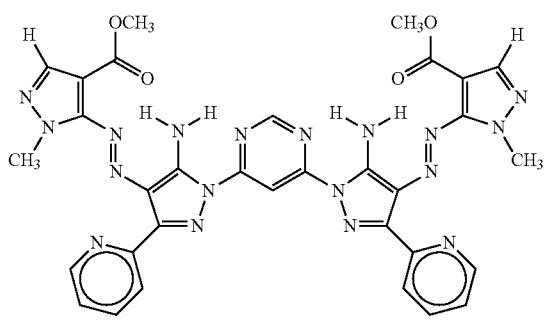

Pig.-6

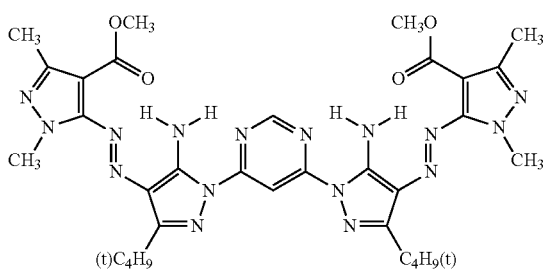

Pig.-7

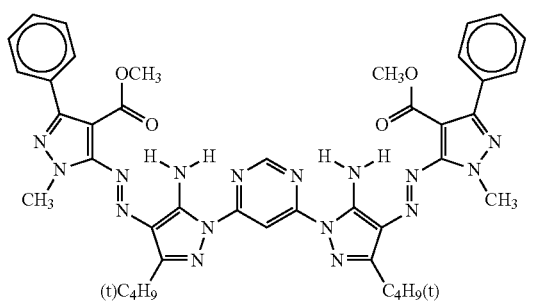

Pig.-8

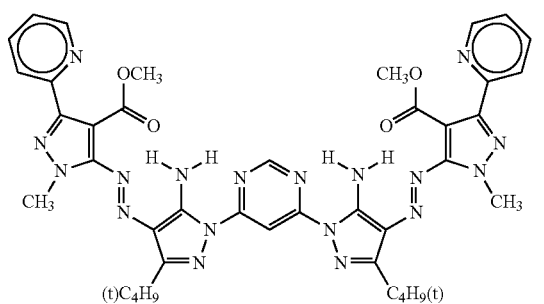

-continued

-continued

-continued

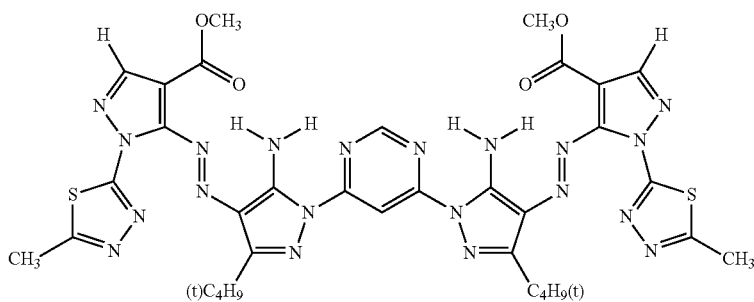
Pig.-38
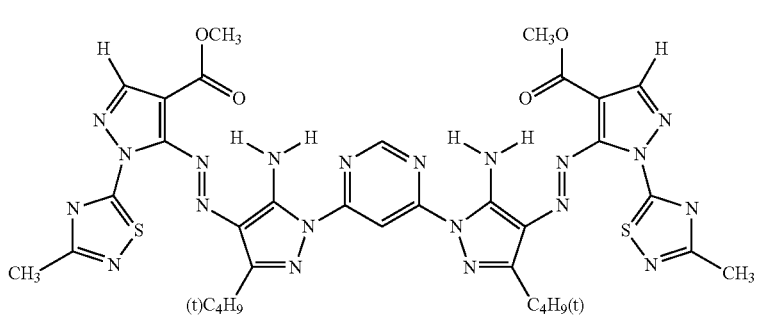
Pig.-39
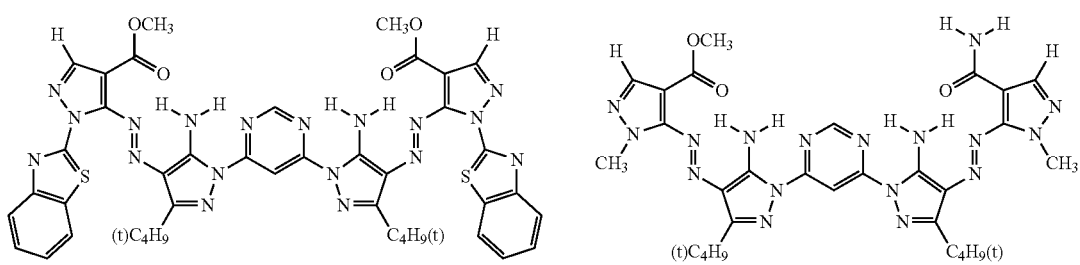
Pig.-40                                    Pig.-41
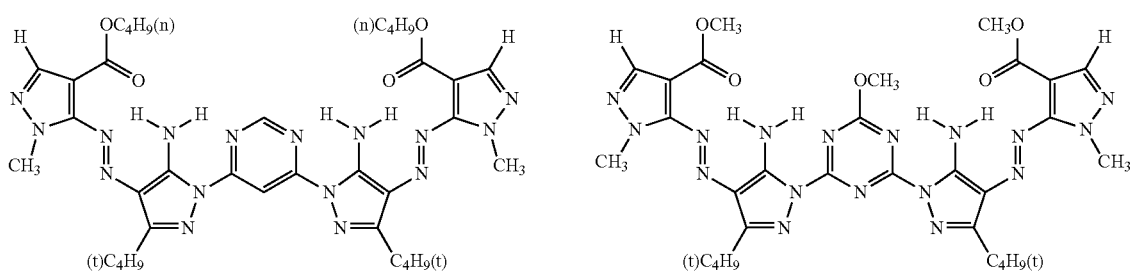
Pig.-42                                    Pig.-43
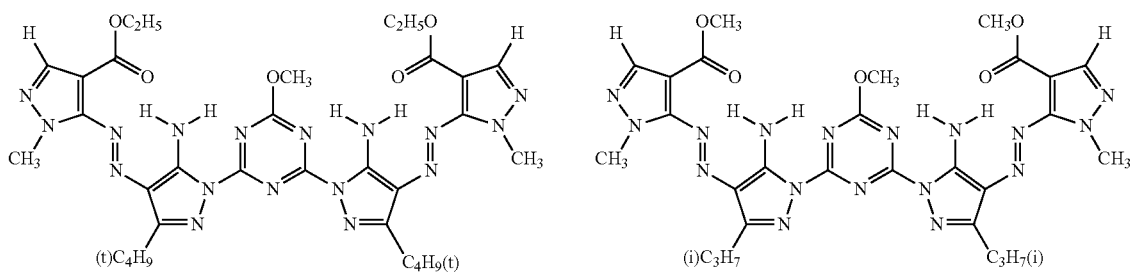
Pig.-44                                    Pig.-45

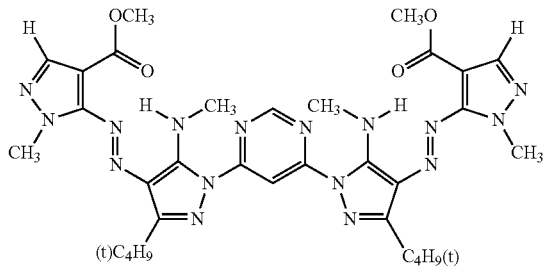

Fig.-46

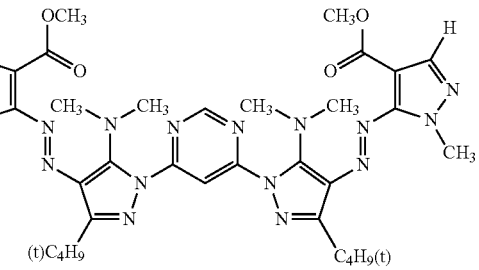

Fig.-47

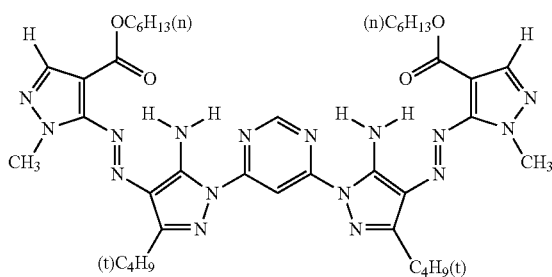

Fig.-48

With respect to the azo pigments represented by Formula (3) in the present invention, the chemical structure formula may be Formula (3) or a tautomer thereof and the crystal form is not particularly limited. For example, pigments having any crystal form which is sometimes referred to as a polymorphism (crystal polymorphism) may be acceptable.

The crystal polymorphism refers to crystals in which the chemical compositions are the same but the arrangements of building blocks (molecules or ions) are different in the crystals. In the crystal polymorphism, the chemical and physical properties are determined depending on the crystal structure and each crystal polymorphism can be distinguished by the rheology, hue, and other color characteristics. Different crystal polymorphism can also be confirmed by X-Ray Diffraction (powder X-ray diffraction measurement results) or X-Ray Analysis (X ray crystal structure analysis results).

When the crystal polymorphism is present in the azo pigments represented by Formula (3) in the present invention, the crystal type may be any polymorphism and may be a mixture of two or more polymorphisms. Azo pigments having a single crystal type are preferably used as the main ingredients. More specifically, the degree of the mixture of crystal polymorphisms is preferably low. The content of azo pigments having a single crystal type is 70% to 100%, preferably 80% to 100%, more preferably 90% to 100%, still more preferably 95% to 100%, and particularly preferably 100% relative to the whole azo pigment By using the azo pigments having a single crystal type as the main ingredients, the regularity of the arrangement of dye molecules is improved and the intramolecular/intermolecular interaction is increases, which results in easy formation of a high order three-dimensional network. As a result, the azo pigments are preferable in terms of the properties required in pigments, such as improvement of hue, or light fastness, heat fastness, humidity fastness, oxidized gas fastness, or solvent resistance.

The mixture ratio of the crystal polymorphisms in the azo pigments can be confirmed from the physicochemical measurement values of solids, such as single crystal X-ray crystal structure analysis, powder X-ray diffraction (XRD), microphotographs (TEM) of crystals, or IR (KBr method).

In the present invention, when the azo pigments represented by Formula (3) have an acid radical, the acid radical may be partially or entirely a salt type or may contain a mixture of a salt type pigment and a free acid type pigment. Examples of the salt type include salts of alkaline metals, such as Na, Li, and K, salts of ammonium that may be substituted with an alkyl group or a hydroxyalkyl group, or salts of organic amines. Examples of the organic amines include a lower alkyl amine, a hydroxyl-substituted lower alkyl amine, a carboxyl-substituted lower alkyl amine, and a polyamine having 2 to 10 alkylene imine units, the unit having 2 to 4 carbon atoms. In the case of the salt types, the type is not limited to one type and a plurality of types may be mixed.

In the structure of the azo pigments to be used in the present invention, when a plurality of acid radicals are contained in the molecule thereof, the plurality of acid radicals each are independently a salt type or an acid type and may be different from each other.

In the invention, the azo pigments represented by Formula (3) may be a hydrate containing water molecules in the crystals and the number of the water molecules contained in the crystals is not particularly limited.

Next, an example of a method for producing the azo pigments represented by Formula (3) will be described. For example, the azo pigments represented by Formula (3) can be produced by converting a heterocyclic amine represented by Formula (A) to a diazonium compound under the acidic condition, performing a coupling reaction between the diazonium compound and the compound represented by Formula (B), and subjecting the reaction mixture to a post-treatment according to a usual manner.

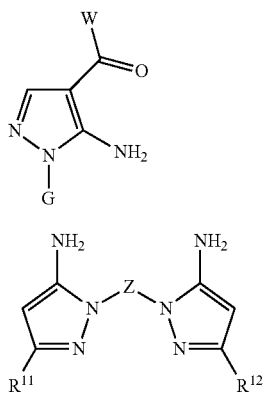

(A)

(B)

In Formulae (A) and (B), W is the same as $W^1$ and $W^2$ in Formula (3), G is the same as $G^1$ and $G^2$ in Formula (3), and $R^{11}$, $R^{12}$, and Z are the same as $R^{11}$, $R^{12}$, and Z, respectively, in Formula (3).

The heterocyclic amine represented by Formula (A) can be produced by known methods in common use, such as methods described in Helv. Chim. Acta, 41, 1958, 1052-1056 or Helv. Chim. Acta, 42, 1959, 349-352, and methods similar thereto.

The compounds represented by Formula (B) can be produced by the methods described in International Publication WO 2006/082669 A1 or JP-A No. 2006-57076 and methods similar thereto.

The reaction of converting the heterocyclic amine represented by Formula (A) to a diazonium compound can be performed by, for example, reacting reagents, such as sodium nitrite, nitrosylsulfuric acid, or isoamyl nitrite in acidic solvents, such as sulfuric acid, phosphoric acid, acetic acid, hydrochloric acid, or methanesulfonic acid at a temperature of 15° C. or lower for a period of about 10 minutes to about 6 hours.

The coupling reaction can be performed by reacting the diazonium salt obtained by the method described above and the compounds represented by Formula (B) at 40° C. or lower and preferably 25° C. or lower for a period of about 10 minutes to about 12 hours.

After completion of the reaction, sometimes deposition of crystals are found. However, generally, water, an alcohol solvent or the like is added to the reaction liquid to deposit the crystals, and the deposited crystals can be collected by filtration. The crystals collected by filtration may be washed and dried as required, thereby obtaining the azo pigment represented by Formula (3).

The azo pigment represented by Formula (3) is obtained as a crude azo pigment by the production method described above. However, when an azo pigment is used in the present invention, post-treatment is preferably performed. Examples of methods for the post-treatment include a pigment particle controlling process by a polishing (abrasive) technique, such as solvent salt milling, salt milling, dry milling, solvent milling, or acid pasting, or solvent heating treatment and a surface treatment process using resins, surfactants, dispersing agents, and the like.

For the azo pigments represented by Formula (3) according to the invention, the solvent heating treatment and/or the solvent salt milling is preferably performed as the post-treatment.

Examples of solvents to be used for the solvent heating treatment include water; aromatic hydrocarbon solvents, such as toluene, or xylene; halogenated hydrocarbon solvents, such as chlorobenzene or o-dichlorobenzene; alcohol solvents, such as isopropanol or isobutanol; polar aprotic organic solvents, such as N,N-dimethyl formamide, N,N-dimethyl acetamide; or N-methyl 2-pyrrolidone, glacial acetic acid, pyridine, or mixtures thereof. Inorganic or organic acids or bases may be added to the solvents mentioned above. The temperature of the solvent heating treatment varies depending on the dimension of the primary particle size of a desired pigment and is preferably 40 to 150° C. and more preferably 60 to 100° C. The treatment time is preferably from 30 minutes to 24 hours.

Examples of the solvent salt milling include a method of putting a crude azo pigment, a mineral salt, and an organic solvent that does not dissolve these components in a kneader, and kneading and polishing the mixture therein. Preferable examples of the mineral salts include water-soluble mineral salts. For example, mineral salts such as sodium chloride, potassium chloride, or sodium sulfate are preferably used. Mineral salts having an average particle size of 0.5 to 50 μm are more preferably used. The used amount of the mineral salts is preferably from 3 to 20 times by mass and more preferably 5 to 15 times by mass that of the crude azo pigment. Preferable examples of the organic solvent include water-soluble organic solvents. However, since the solvents are likely to evaporate due to increase in temperature during kneading, high boiling point solvents are preferable in terms of safety.

Examples of such water-soluble organic solvents include diethylene glycol, glycerin, ethylene glycol, propylene glycol, liquid polyethylene glycol, liquid polypropylene glycol, 2-(methoxymethoxy)ethanol, 2- butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The use amount of the water-soluble organic solvents is preferably 0.1 to 5 times by mass that of the crude azo pigment. The kneading temperature is preferably 20 to 130° C. and particularly preferably from 40 to 110° C. As the kneader, for example, a kneader or a mixing muller can be used.

The smaller average particle size of the organic pigments, the better from the viewpoint of transparency and color reproduction properties, while the larger average particle size of the organic pigments, the better from the viewpoint of light fastness. In order to achieve these properties in combination, the average particle size is preferably 10 to 200 nm, more preferably 10 to 150 nm, and still more preferably 10 to 120 nm. The particle size distribution of the organic pigments is not particularly limited. Any suitable organic pigments having a large particle size distribution or a monodisperse particle size distribution may be acceptable. Two or more kinds of the organic pigments having a monodisperse particle size distribution may be mixed for use.

The content of the pigments is preferably 1 to 25% by mass, more preferably 2 to 20% by mass, still more preferably 5 to 20% by mass, and particularly preferably 5 to 15% by mass relative to the total mass of the ink composition.

Dispersing Agent

The ink composition of the present invention may contain at least one dispersing agent. As the dispersing agent of the pigment, any suitable polymer dispersing agents or low molecular surfactant type dispersing agents may be acceptable. The polymer dispersing agents may be water-soluble dispersing agents or water-insoluble dispersing agents.

The low molecular surfactant type dispersing agents can make the pigment disperse stably in a water solvent while maintaining the ink at a low viscosity. The low molecular surfactant type dispersing agents are low molecular dispersing agents having a molecular weight of 2,000 or lower. The molecular weight of the low molecular surfactant type dispersing agents is preferably 100 to 2,000 and more preferably 200 to 2,000.

The low molecular surfactant type dispersing agents have a structure containing a hydrophilic group and a hydrophobic group. One or more hydrophilic groups and one or more hydrophobic groups may each independently be contained in the molecule of the dispersing agent and plural kinds of hydrophilic groups or hydrophobic groups may be contained in the molecule. A linking group for connecting the hydrophilic group and the hydrophobic group may be contained as appropriate.

Examples of the hydrophilic group include an anionic group, a cationic group, a nonionic group, or a betaine type group in which these groups are combined. Any suitable anionic group may be used insofar as the anionic group has a negative charge. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group and a carboxylic acid group, and still more preferably a carboxylic acid group. Any suitable cationic group may be used insofar as the cationic group has a positive charge and is preferably an organic cationic substituent and more preferably a cationic group of nitrogen or phosphorus. The cationic group is still more preferably pyridinium cation or ammonium cation. Examples of the nonionic group include polyethylene oxide, polyglycerin, and a part of sugar units.

The hydrophilic group is preferably an anionic group.

When the low-molecular surfactant-type dispersant has an anionic hydrophilic group, the dispersant preferably has a pKa of 3 or more, in terms of promoting coagulation reaction upon contacting with an acidic treatment liquid. The pKa mentioned here is an experimentally-obtained value based on a titration curve which is obtained by titrating a 1 mmol/L solution of a low-molecular surfactant-type dispersant in tetrahydrofuran/water at a ratio of 3:2 (THF:water, V/V), with an acid or alkali aqueous solution. When the pKa of the low-molecular surfactant-type dispersant is 3 or more, 50% or more of the anionic groups theoretically become undissociated upon contact with a liquid having a pH of around 3. Accordingly, the water-solubility of the low-molecular surfactant-type dispersant is significantly reduced, as a result of which a coagulation reaction occurs, namely, the coagulation reactivity is improved. From this point of view, the low-molecular surfactant-type dispersant preferably has a carboxyl group as an anionic group.

The hydrophobic group has, for example, a hydrocarbon structure, a fluorocarbon structure, or a silicone structure, and the hydrocarbon structure is preferable. The hydrophobic group may have either a straight-chain structure or a branched structure. Further, the hydrophobic group may have a single-chain structure or multi-chain structure. When there are two or more chains, the chains may include two or more kinds of hydrophobic group. The hydrophobic group is preferably a hydrocarbon group having a carbon number of from 2 to 24, more preferably from 4 to 24, and yet more preferably from 6 to 20.

When the polymeric dispersant is a water-soluble dispersant, examples thereof include a hydrophilic polymeric dispersant. Examples of natural hydrophilic polymeric compounds include plant polymers such as gum arabic, gum tragacanth, guar gum, gum karaya, locust bean gum, arabinogalactan, pectin and quince seed starch; marine alga polymers such as alginic acid, carrageenan and agar; animal polymers such as gelatin, casein, albumin and collagen; and microbial polymers such as xanthene gum and dextran.

Examples of hydrophilic polymeric compounds obtained by modifying natural raw materials include fibrous polymers such as methyl cellulose, ethyl cellulose, hydroxyethyl cellulose, hydroxypropyl cellulose and carboxymethyl cellulose, starch polymers such as sodium starch glycolate (sodium salt of starch glycolate), and sodium starch phosphate (sodium salt of starch phosphate [ester]), and algae polymers such as sodium alginate and propylene glycol alginate.

Examples of synthetic hydrophilic polymeric compounds include vinyl polymers such as polyvinyl alcohol, polyvinyl pyrrolidone and polyvinyl methyl ether; acrylic resins such as non-crosslinked polyacrylamide, polyacrylic acid or an alkali metal salt thereof, and water-soluble styrene acrylic resins; water-soluble styrene maleic acid resin; water-soluble vinylnaphthalene acrylic resin; water-soluble vinylnaphthalene maleic acid resins; alkali metal salts of formalin condensates of β-naphthalene sulfonic acid; polymeric compounds having, at a side chain, a salt of a cationic functional group such as a quaternary ammonium group or an amino group; and natural polymeric compounds such as shellac.

Among these, water-soluble dispersants to which a carboxyl group is introduced are preferable, and examples thereof include homopolymers of acrylic acid, methacrylic acid or styrene acrylic acid, and copolymers thereof with another monomer having a hydrophilic group.

The water-insoluble dispersants include a polymer having both hydrophilic and hydrophobic moieties, such as styrene-(meth)acrylic acid copolymer, styrene-(meth)acrylic acid-(meth)acrylate copolymer, (meth)acrylate-(meth)acrylic acid copolymer, polyethylene glycol(meth)acrylate-(meth)acrylic acid copolymer, vinylacetate-maleic acid copolymer, and styrene-maleic acid copolymer.

The weight average molecular weight of the polymer dispersant is preferably from 3,000 to 100,000, more preferably from 5,000 to 50,000, further preferably from 5,000 to 40,000, and yet further preferably from 10,000 to 40,000.

The polymer dispersant preferably includes a polymer having a carboxyl group, more preferably a polymer having a carboxyl group and an acid value of 100 mgKOH/g or less, and still more preferably from 25 mgKOH/g to 100 mgKOH/g, from the viewpoint of the self-dispersing properties and the coagulation speed at the time when the self-dispersing polymer contacts a treatment liquid. Particularly, in a case in which the ink composition of the present invention is used in combination with a treatment liquid (its details are described later), a polymer having a carboxyl group and an acid value of from 25 mgKOH/g to 100 mgKOH/g is effective.

The mixing ratio by mass of pigment (p) to dispersant (s) (p:s) is preferably in a range of from 1:0.06 to 1:3, more preferably in a range of from 1:0.125 to 1:2, and still more preferably in a range of from 1:0.125 to 1:1.5.

In the present invention, when a dye is used as a colorant, a dye retained on a water-insoluble carrier may be used as a water-insoluble colorant particle. The dye may be selected from known dyes without particular restrictions, and the dyes described in, for example, JP-A Nos. 2001-115066, 2001-335714, and 2002-249677 may be used suitably in the present invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be used suitably in the present invention.

The carrier retaining the dye (water-insoluble colorant particle) may be used in the form of an aqueous dispersion containing a dispersant. As the dispersant, the above-mentioned dispersants may be used suitably.

In the present invention, the ink composition preferably includes a pigment and a dispersant, more preferably includes an organic pigment and a polymer dispersant, and particularly preferably includes an organic pigment and a polymer dispersant containing carboxyl group, in consideration of the light-fastness, quality, and the like of the image. From the viewpoint of coagulation properties, it is preferable that the pigment is covered with a polymer dispersant having a carboxyl group and is water-insoluble.

The average particle diameter of the pigment in the dispersion state is preferably from 10 nm to 200 nm, more preferably from 10 nm to 150 nm, and still more preferably from 10 nm to 100 nm. When the average particle diameter is 200 nm or less, color reproducibility is excellent, and jetting properties are excellent when jetting droplets by an ink-jet method. When the average particle diameter is 10 nm or more, light-fastness is secured. The particle size distribution of the colorant is not particularly limited, and may be a broad particle size distribution or a monodisperse particle size distribution. It is also possible to use a mixture of two or more colorants having monodisperse particle size distributions.

The average particle diameter of the pigment in the dispersion state and the average particle diameter and the particle size distribution of the polymer particles are obtained by measuring volume average particle diameter by a dynamic light scattering method, using a Nanotrac particle size distribution measuring instrument UPA-EX150 (trade name, manufactured by NIKKISO Co., Ltd.).

The pigment may be used singly or in combination of two or more thereof. From the viewpoint of image density, the content of pigment in the ink composition is preferably from 1 to 25% by mass, more preferably from 2 to 20% by mass, still more preferably from 5 to 20% by mass, and particularly preferably from 5 to 15% by mass, with respect to the ink composition.

Polymer Particle

In the present invention, the ink composition includes at least one type of polymer particles. As the polymer particles, self-dispersing polymer particles are preferable.

In the following, self-dispersing polymer particles, as an example of preferable polymer particles, are described in detail.

Self-Dispersing Polymer Particles

In the present invention, the ink composition preferably includes, as the polymer particles, at least one type of self-dispersing polymer particles. The self-dispersing polymer particles have a function such that when the self-dispersing polymer particles contact the below-mentioned treatment liquid or an area to which the treatment liquid has been applied and dried, the dispersion state of the self-dispersing polymer particles becomes unstable and the self-dispersing polymer particles aggregate, whereby the viscosity of the ink is increased and the immobilization of the ink composition is achieved. Thus, the self-dispersing polymer particles further improve the fixability of the ink composition to a recording medium and the rubbing resistance of an image. The self-dispersing polymer particles are considered to be preferable resin particles also from the viewpoint of ejection stability and liquid stability (particularly, dispersion stability) of the system containing the pigment.

The self-dispersing polymer particles are particles of a water-insoluble polymer that, in the absence of any surfactant, can get into a dispersed state (particularly, dispersed state achieved by a phase inversion emulsification) in an aqueous medium due to a functional group (particularly, an acidic group or a salt thereof) which the polymer itself has, and particles of a water-insoluble polymer that does not contain a free emulsifier.

The scope of the term, "dispersed state", used herein includes an emulsified state (emulsion) in which a water-insoluble polymer in the liquid state is dispersed in an aqueous medium and a state (suspension) in which a water-insoluble polymer in the solid state is dispersed in an aqueous medium.

The water-insoluble polymer used in the present invention is preferably a water-insoluble polymer that can get into a dispersed state in which the water-insoluble polymer is dispersed in the solid state, in consideration of the aggregation speed and the fixability when the water-insoluble polymer is contained in a liquid composition.

Examples of a method for preparing an emulsified or dispersed self-dispersible polymer, i.e., an aqueous dispersion of the self-dispersible polymer, include a phase inversion emulsification method. Examples of the phase inversion emulsification method include a method including dissolving or dispersing the self-dispersible polymer in a solvent (e.g., a hydrophilic organic solvent), putting the resultant substance as it is in water without adding a surfactant, stirring and mixing the resultant substance in a state where a salt-producing group (e.g., an acidic group) of the self-dispersible polymer is neutralized, and removing the solvent, thereby obtaining an emulsified or dispersed aqueous dispersion.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic), the mixture is stirred with a stirrer having a stirring blade at a rotation rate of 200 rpm at 25° C. for 30 minutes, and the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersing polymer.

The term "water-insoluble polymer" used herein refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility mentioned above is a value measured after the polymer is 100% neutralized with either sodium hydroxide or acetic acid depending on the kind of the salt-forming groups of the water-insoluble polymer.

The aqueous medium includes water as a component and, optionally, a hydrophilic organic solvent. In the present invention, the aqueous medium is preferably formed by water and a hydrophilic organic solvent whose amount is 0.2% by mass or less with respect to the amount of the water, and is more preferably formed by water only.

The main chain backbone of the water-insoluble polymer is not particularly limited, and may be, for example, a vinyl polymer or a condensed polymer (such as an epoxy resin, polyester, polyurethane, polyamide, cellulose, polyether, polyurea, polyimide, or polycarbonate). Among them, a vinyl polymer is preferable.

Preferable examples of the vinyl polymer and the monomer or monomers for forming the vinyl polymer include those described in JP-A Nos. 2001-181549 and 2002-88294. A vinyl polymer may be used which has a dissociative group introduced to a terminal of the polymer chain; the dissociative group may be introduced by radical polymerization of a vinyl monomer using a chain transfer agent, polymerization initiator, or iniferter that has the dissociative group (or a substituent that can be converted to the dissociative group), or by ion polymerization using a compound having the dissociative group (or a substituent that can be converted to the dissociative group) as either of an initiator or a terminator.

Preferable examples of the condensed polymer and the monomers for forming the condensed polymer include those described in JP-A No. 2001-247787.

The particles of the self-dispersible polymer preferably contain a water-insoluble polymer containing a hydrophilic constituent unit and a constituent unit derived from an aromatic group-containing monomer or a cycloaliphatic group-containing monomer as a hydrophobic constituent unit from the viewpoint of self-dispersibility.

The hydrophilic structural unit is not particularly limited as long as it derives from a monomer containing a hydrophilic group. The hydrophilic structural unit may derive from only one type of hydrophilic-group-containing monomer or from two or more types of hydrophilic-group-containing monomer. The hydrophilic group is not particularly limited, and may be a dissociative group or a nonionic hydrophilic group.

In the present invention, the hydrophilic group is preferably a dissociative group, and more preferably an anionic dissociative group, from the viewpoints of enhancing self-dispersibility and providing stability of the formed emulsion or dispersion state. Examples of the dissociative group include a carboxyl group, a phosphoric acid group and a sulfonic acid group. In particular, a carboxyl group is preferable as the dissociative group, in consideration of fixability of an ink composition containing the self-dispersing polymer particles.

The hydrophilic-group-containing monomer in the present invention is preferably a monomer containing a dissociative group, and more preferably a monomer containing a dissociative group and an ethylenic unsaturated bond, in consideration of self-dispersibility and aggregation property.

The dissociative-group-containing monomer may be, for example, an unsaturated carboxylic acid monomer, an unsaturated sulfonic acid monomer, or an unsaturated phosphoric acid monomer Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamide-2-methylpropane sulfonic acid, 3-sulfopropyl(meth)acrylate, and bis-(3-sulfopropyl)itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, acrylic type monomers are more preferable, and acrylic acid and methacrylic acid are still more preferable, in consideration of dispersion stability and ejection stability.

In the present invention, the acid value of the self-dispersing polymer is preferably 150 mgKOH/g or less from the viewpoint of achieving satisfactory coagulation properties when an ink composition contacts a treatment liquid. The acid value is more preferably from 25 mgKOH/g to 100 mgKOH/g, and still more preferably from 30 mgKOH/g to 70 mgKOH/g. When the acid value of the self-dispersing polymer is 25 mgKOH/g or more, the stability of the self-dispersibility is enhanced.

The self-dispersing polymer particles in the present invention preferably contains a polymer having a carboxyl group, more preferably contains a polymer having a carboxyl group and an acid value of from 25 mgKOH/g to 150 mgKOH/g, and still more preferably contains a polymer having a carboxyl group and an acid value of from 30 mgKOH/g to 100 mgKOH/g, from the viewpoint of self-dispersibility and coagulation speed at the time of contact with the treatment liquid.

The aromatic-group-containing monomer is not particularly limited as long as the monomer is a compound containing an aromatic group and a polymerizable group. The aromatic group may be a group derived from an aromatic hydrocarbon or from an aromatic—heterocycle. In the present invention, the aromatic group is preferably an aromatic group derived from an aromatic hydrocarbon, from the viewpoint of improving the stability of the particle shape in an aqueous medium.

The polymerizable group may be a condensation-polymerizable group or an addition-polymerizable group. In the present invention, the polymerizable group is preferably an addition-polymerizable group, and more preferably a group containing an ethylenic unsaturated bond, from the viewpoint of improving the stability of the particle shape in an aqueous medium.

The aromatic-group-containing monomer in the present invention is preferably a monomer having an aromatic group derived from an aromatic hydrocarbon and an ethylenic unsaturated bond. The aromatic-group-containing monomer may be used singly or in combination of two or more thereof.

Examples of the aromatic-group-containing monomer include phenoxyethyl (meth)acrylate, benzyl (meth)acrylate, phenyl (meth)acrylate, and a styrene-based monomer. In particular, from the viewpoint of improving the balance between the hydrophilicity and hydrophobicity of the polymer chain and ink fixability, an aromatic-group-containing (meth)acrylate monomer is preferable, and at least one selected from phenoxyethyl(meth)acrylate, benzyl(meth)acrylate, or phenyl(meth)acrylate is more preferable, and phenoxyethyl (meth)acrylate and benzyl(meth)acrylate are still more preferable.

The term "(meth)acrylate" used herein refers to acrylate or methacrylate.

The self-dispersing polymer in the invention is preferably an acrylic resin containing a constituent unit derived from a (meth)acrylate monomer and is preferably an acrylic resin containing a constituent unit derived from aromatic group-containing (meth)acrylate. Further, it is preferable that a constituent unit derived from aromatic group-containing (meth) acrylate is contained in the acrylic resin and the content of the aromatic group-containing (meth)acrylate is from 10% by mass to 95% by mass. When the content of the aromatic group-containing (meth) acrylate is 10% by mass to 95% by mass, the stability of self-emulsification or a dispersion state can be improved, and moreover an increase in the ink viscosity can be suppressed. In the invention, from the viewpoint of the stability of a self-dispersion state, stabilization of the particle shape in an aqueous medium due to hydrophobic interaction between aromatic rings, and a reduction in the amount of water-soluble components due to rendering particles moderately hydrophobic, the range of 15% by mass to 90% by mass is more preferable, the range of 15% by mass to 80% by mass is still more preferable, and the range of 25% by mass to 70% by mass is particularly preferable.

In the present invention, the self-dispersing polymer may include, for example, a structural unit derived from an aromatic-group-containing monomer and a structural unit derived from a dissociative-group-containing monomer. The self-dispersing polymer may further include another structural unit, as necessary.

The monomer for forming another structural unit is not particularly limited as long as the monomer is copolymerizable with the aromatic-group-containing monomer and the dissociative-group-containing monomer. In particular, an alkyl-group-containing monomer is preferable from the viewpoint of flexibility of the polymer skeleton and ease in regulating the glass transition temperature (Tg).

Examples of the alkyl-group-containing monomer include (meth)acrylic ester monomers such as alkyl(meth)acrylates (such as methy(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, and ethylhexyl(meth)acrylate), ethylenic unsaturated monomers each having a hydroxyl group (such as hydroxymethyl(meth)acrylate, 2-hydroxyethyl (meth)acrylate, 2-hydroxypropyl(meth)acrylate, 4-hydroxybutyl (meth)acrylate, hydroxypentyl(meth)acrylate, and hydroxyhexyl(meth)acrylate, and dialkylaminoalkyl(meth)acrylates such as dimethylaminoethyl(meth)acrylate; and (meth)acrylamide monomers such as N-hydroxyalkyl(meth)acrylamides (such as N-hydroxymethyl(meth)acrylamide, N-hydroxyethyl(meth)acrylamide, and N-hydroxybutyl (meth)acrylamide) and N-alkoxyalkyl(meth)acrylamides (such as N-methoxymethyl(meth)acrylamide, N-ethoxymethyl(meth)acrylamide, N-(n-, iso)butoxymethyl(meth)acrylamide, N-methoxyethyl(meth)acrylamide, N-ethoxyethyl (meth)acrylamide, and N-(n-, iso)butoxyethyl(meth) acrylamide).

The molecular weight of the water-insoluble polymer forming the self-dispersing polymer particles is preferably from 3,000 to 200,000, more preferably from 5,000 to 150,000, and still more preferably from 10,000 to 100,000, in terms of weight average molecular weight. When the weight average molecular weight is 3,000 or more, the amount of water-soluble component can be effectively set to a small amount. When the weight average molecular weight is 200,000 or less, the stability of the self-dispersibility can be improved.

The weight average molecular weight is measured with a gel permeation chromatography (GPC). As a GPC instrument, HLC-8220GPC manufactured by Tosoh Corporation, is used; the columns (three in number) to be used are TSKgel Super HZM-H, TSKgel SuperHZ4000, and TSKgel SuperHZ2000 (all manufactured by Tosoh Corporation, 4.6 mmID×15 cm); and THF (tetrahydrofuran) is used as an eluent. Further measurement conditions are set as follows.
Sample concentration: 0.35% by mass
Flow rate: 0.35 ml/min
Injected amount of sample: 10 μl
Measuring temperature: 40° C.
Measurement is conducted using an I R detector.

The calibration curve is prepared from 8 samples of "Standard sample TSK standard, polystyrene": "F-40", "F-20", "F-4", "F-1", "A-5000", "A-2500", "A-1000" and "n-PROPYL BENZENE" (all trade names, manufactured TOSHO CORPORATION).

The water-insoluble polymer forming the self-dispersing polymer particles preferably contains a structural unit derived from an aromatic-group-containing (meth)acrylate monomer (preferably a structural unit derived from phenoxyethyl (meth)acrylate and/or a structural unit derived from benzyl (meth)acrylate) at the copolymerization ratio of from 15 to 80% by mass with respect to the total mass of the self-dispersing polymer particles, from the viewpoint of regulating the hydrophilicity/hydrophobicity of the polymer.

The water-insoluble polymer, from the viewpoint of regulating the hydrophilicity/hydrophobicity of the polymer, preferably includes a structural unit derived from an aromatic-group-containing (meth)acrylate monomer at the copolymerization ratio of from 15 to 80% by mass, a structural unit derived from a carboxyl-group-containing monomer, and a structural unit derived from an alkyl-group-containing monomer (preferably a structural unit derived from an alkyl(meth)acrylate), and more preferably includes a structural unit derived from phenoxyethyl(meth)acrylate and/or a structural unit derived from benzyl(meth)acrylate at a total copolymerization ratio of from 15 to 80% by mass, a structural unit derived from a carboxyl-group-containing monomer, and a structural unit derived from an alkyl-group-containing monomer (preferably a structural unit derived from (meth)acrylic ester of an alkyl having 1 to 4 carbon atoms); further it is preferable that the acid value of the water-insoluble polymer is from 25 to 100 (mg KOH/g) and the weight average molecular weight of the water-insoluble polymer is from 3,000 to 200,000, and it is more preferable that the acid value is from 25 to 95 (mg KOH/g) and the weight average molecular weight is from 5,000 to 150,000.

Examples (exemplary compounds B-01 to B-19, C-1 to C-5) of the water-insoluble polymer forming the self-dispersing polymer particles are shown below. However, the present invention is not limited thereto. The numbers in the parentheses indicate mass ratios of copolymerization components.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/ methacrylic acid copolymer (50/44/6)
B-04: phenoxyethyl acrylate/methyl methacrylate/ethyl acrylate/acrylic acid copolymer (30/55/10/5)
B-05: benzylmethacrylate/isobutyl methacrylate/methacrylic acid copolymer (35/59/6)
B-06: styrene/phenoxyethyl acrylate/methyl methacrylate/ acrylic acid copolymer (10/50/35/5)
B-07: benzyl acrylate/methyl methacrylate/acrylic acid copolymer (55/40/5)
B-08: phenoxyethyl methacrylate/benzyl acrylate/methacrylic acid copolymer (45/47/8)
B-09: styrene/phenoxyethyl acrylate/butyl methacrylate/ acrylic acid copolymer (5/48/40/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

The method of producing the water-insoluble polymer forming the self-dispersing polymer particles in the present invention is not particularly limited, and may be a method including performing emulsion polymerization in the presence of a polymerizable surfactant so as to covalently bond the surfactant to the water-insoluble polymer or a method including copolymerizing a monomer mixture containing the hydrophilic-group-containing monomer and the aromatic-group-containing monomer by a known polymerization process such as a solution polymerization method or a bulk polymerization method. Among the above polymerization methods, a solution polymerization is preferable, and a solution polymerization method using an organic solvent is more preferable, in consideration of aggregation speed and jetting stability of an ink composition containing the self-dispersing polymer particles.

From the viewpoint of aggregation speed, the self-dispersing polymer in the present invention preferably includes a polymer synthesized in an organic solvent, wherein the polymer has carboxyl groups, all or some of the carboxyl groups of the polymer are neutralized (to give an acid value of preferably from 25 to 50 mg KOH/g), and the polymer is prepared in the form of a polymer dispersion in which water constitutes the continuous phase. In other words, the production of the self-dispersing polymer particles in the present invention preferably includes a step of synthesizing a polymer in an organic solvent and a dispersing step of forming an aqueous dispersion in which at least some of the carboxyl groups of the polymer are neutralized.

The dispersion step preferably includes the following sub-steps (1) and (2):

Sub-step (1): a step of stirring a mixture containing a polymer (water-insoluble polymer), an organic solvent, a neutralizing agent, and an aqueous medium Sub-step (2): a step of removing the organic solvent from the mixture The sub-step (1) is preferably a process in which the polymer (water-insoluble polymer) is dissolved in the organic solvent, and then the neutralizing agent and the aqueous medium are gradually added to the polymer solution and mixed, by stirring, with the polymer solution to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without requiring a strong shearing force.

The method of stirring the mixture is not particularly limited, and may be a method using a generally-used mixing and stirring apparatus and/or, if necessary, a disperser such as an ultrasonic disperser or a high-pressure homogenizer.

Preferable examples of the organic solvent described above include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone together for the purpose of making the polarity change milder at the time of phase inversion from an oil phase to an aqueous phase. The combination of these solvents makes it possible to obtain self-dispersing polymer particles having a very small particle diameter that are free from aggregation precipitation or adhesion between the particles and that have high dispersion stability.

The neutralizing agent is used to neutralize all or some of the dissociative groups of the polymer so as to allow the self-dispersing polymer to get into a stable emulsion or dispersion state in water. When the self-dispersing polymer in the present invention has an anionic dissociative group (e.g., a carboxyl group) as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of dispersion stability in water of the self-dispersing polymer particles used in the present invention.

The amount of the basic compound to be used is preferably from 5 to 120% by mol, more preferably from 10 to 110% by mol, and still more preferably from 15 to 100% by mol, with respect to 100% by mol of the dissociative group. When the amount of the basic compound is 15% by mol or more, an effect of stabilizing the dispersion of the particles in water can be especially enhanced. When the amount of the basic compound is 100% by mol or less, an effect of decreasing the amount of the water-soluble component can be obtained.

In the sub-step (2), the organic solvent is removed, by distillation, from the dispersion obtained in the sub-step (1) using a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the remaining organic solvent is preferably 0.2% by mass or less, and more preferably 0.1% by mass or less.

The average particle size of the polymer particles in the invention is preferably in the range of from 1 nm to 70 nm, more preferably from 2 nm to 60 nm, and still more preferably from 2 nm to 30 nm. When the volume average particle size is 2 nm or more, the suitability of production is improved. When the volume average particle size is 70 nm or less, local blocking resistance is improved.

The particle size distribution of the self-dispersing polymer particles is not particularly limited, and the self-dispersing polymer particles may have a broad particle size distribution or a mono-dispersed particle size distribution. It is possible to use a mixture of two or more types of water-insoluble particles.

The average particle diameter and particle size distribution of the self-dispersing polymer particles is obtained by measuring the volume average particle diameters of the particles by a dynamic light scattering method using NANOTRAC particle size analyzer UPA-EX 150 (trade name, manufactured by Nikkiso Co., Ltd).

The glass transition temperature (Tg) of the self-dispersible polymer of the invention is preferably 70° C. or more, more preferably 80° C. or more and still more preferably 100° C. or more. When the glass transition temperature (Tg) is 70° C. or more, local blocking resistance is improved. The upper limit of the glass transition temperature (Tg) is not particularly limited.

It is possible to use either one type of self-dispersing polymer particles or a mixture of two or more types of self-dispersing polymer particles.

The content of the self-dispersing polymer particles in the ink composition is preferably from 1 to 30% by mass, and more preferably from 5 to 15% by mass, with respect to the ink composition, from the viewpoint of aggregation speed, image gloss, and the like.

In the ink composition, the content ratio of pigment to self-dispersing polymer particles (for example, water-insoluble pigment particles/self-dispersing polymer particles) is preferably in the range of from 1/0.5 to 1/10, and more preferably in the range of from 1/1 to 1/4, from the viewpoint of, for example, rubbing resistance of an image.

As described above, the self-dispersing polymer particles are described as an example of preferable polymer particles but other polymer particles can be used without being limited to the self-dispersing polymer particles. For example, polymer particles of a generally known emulsion polymerization latex and the like can also be favorably used by adjusting the constituent monomer, emulsifier, dispersion conditions, and the like.

Initiator

In the present invention, the ink composition may include at least one initiator that initiates polymerization of the polymerizable compound when irradiated with an active energy radiation. The below-mentioned treatment liquid may also include an initiator, or may be a liquid not containing an initiator. The photopolymerization initiator may be used singly or in a mixture of two or more thereof. The photopolymerization initiator may be used together with a sensitizer.

The initiator may be appropriately selected from compounds that can initiate a polymerization reaction when irradiated with an active energy radiation, and examples thereof include an initiator, such as a photopolymerization initiator, that generates an active species (for example, a radical, an acid, or a base) when irradiated with a radiation or light or an electron beam.

Examples of the photopolymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoine, benzoin methyl ether, benzoin ethyl ether, benzoin isopropyl ether, benzoin n-propyl ether, benzoin isobutyl ether, benzoin n-butyl ether, benzil dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, 1-(4-isopropylphenyl)-2-hydroxy-2-methylpropane-1-one, and methyl benzoyl formate. Further examples include an aromatic diazonium salt, an aromatic halonium salt, an aromatic sulfonium salt, and a metallocene compound, such as triphenylsulfonium hexafluorophosphate or diphenyliodonium hexafluoroantimonate.

When the ink composition includes an initiator, the content of the initiator in the ink composition may be from 1 to 40% by mass, and more preferably from 5 to 30% by mass, with respect to the amount of the polymerizable compound. When the content of the initiator is 1% by mass or more, the rubbing resistance of an image is further improved, which is preferable in high-speed recording. A content of the initiator of 4.0% by mass or less is preferable in terms of ejection stability.

Examples of the sensitizer include an amine-containing compound such as an aliphatic amine, an amine having an aromatic group, or piperidine; a urea such as an allyl-containing urea or o-tolylthiourea; a sulfur-containing compound such as sodium diethyldithiophosphate or a soluble salt of an aromatic sulfinic acid; a nitrile-containing compound such as N,N-disubstituted p-aminobenzonitrile; a phosphorus-containing compound such as tri-n-butylphosphine or sodium diethyl dithiophosphate; a nitrogen-containing compound such as Michler's ketone, a N-nitrosohydroxylamine derivative, an oxazolidine compound, a tetrahydro-1,3-oxazine compound, or a condensate of a diamine with formaldehyde or acetoaldehyde; a chlorine-containing compound such as carbon tetrachloride or hexachloroethane; a high-molecular-weight amine that is a reaction product of an epoxy resin and an amine; and triethanolamine triacrylate.

The sensitizer may be contained so far as the effects of the present invention are not impaired.

Water

The ink composition includes water, and the content of water in the ink composition is not particularly limited. The content of water in the ink composition is preferably from 10 to 99% by mass, more preferably from 30 to 80% by mass, and still more preferably from 50 to 70% by mass.

Other Additives

The ink composition used in the present invention may further include other additives than the aforementioned components, such as known additives including an anti-drying agent (moistener), an anti-fading agent, an emulsion stabilizer, a penetration enhancing agent, a UV absorber, an antiseptic agent, a mildew-proofing agent, a pH adjuster, a surface-tension controller, an antifoam agent, a viscosity adjuster, a dispersant, a dispersion stabilizer, an antirust agent and a chelating agent. When these additives are added to the ink composition, they are usually directly added to the ink composition. When a dispersion of an oily dye is used, these additives are usually added to the dispersion after the preparation of the dye dispersion. However, these additives may be added to an oil phase or aqueous phase during the preparation of the dye dispersion.

The use of the UV absorber may improve the storability of an image, and examples of the UV absorber include: benzotriazole compounds such as those described in JP-A Nos. 58-185677, 61-190537, 2-782, 5-197075 and 9-34057; benzophenone compounds such as those described in JP-A Nos. 46-2784 and 5-194483 and U.S. Pat. No. 3,214,463; cinnamic compounds such as those described in Japanese Patent Nos. 48-30492 and 56-21141 and JP-A No. 10-88106; triazine compounds such as those described in JP-A No. 4-298503, 8-53427, 8-239368, and 10-182621, and Japanese Patent Application National phase Publication No. 8-501291; compounds described in Research Disclosure No. 24239; and so-called fluorescent brighteners that emit fluorescent light upon absorption of UV rays, such as stilbene compounds and benzoxazole compounds.

The anti-fading agent may be used for improving the storability of an image, and examples thereof include an organic anti-fading agent and a metal complex anti-fading agent. Examples of the organic anti-fading agent include hydroquinones, alkoxyphenols, dialkoxyphenols, phenols, anilines, amines, indanes, chromanes, alkoxyanilines and heterocyclic compounds. Examples of the metal complex anti-fading agent include nickel complexes and zinc complexes. More specifically, examples of usable anti-fading agents include those described in the patents cited in Research Disclosure No. 17643, Section VII, Items I to J; Research Disclosure No. 15162; Research Disclosure No. 18716, page 650, left column; Research Disclosure No. 36544, page 527; Research Disclosure No. 307105, page 872; Research Disclosure No. 15162; and compounds within the scope of the chemical formulae and examples of representative compounds described in pages 127 to 137 of JP-A No. 62-215272.

Examples of the mildew-proofing agent include sodium dehydroacetate, sodium benzoate, sodium pyridinethion-1-oxide, ethyl p-hydroxybenzoate, 1,2-benzoisothiazolin-3-one, and salts thereof. The content of the mildew-proofing agent is preferably from 0.02 to 1.00% by mass with respect to the ink composition.

Examples of the pH adjuster include a neutralizer such as an organic base or an inorganic alkali. The pH adjuster may improve the storability of the ink composition. The pH adjuster is preferably added at such an amount that the pH of the ink composition becomes from 6 to 10, more preferably from 7 to 10.

Examples of the surface-tension controller include nonionic surfactants, cationic surfactants, anionic surfactants, and betaine surfactants.

The surface-tension controller is preferably added in such an amount that the surface tension of the ink composition is from 20 to 60 mN/m, more preferably from 20 to 45 mN/m, and further preferably from 25 to 40 mN/m. When the surface-tension controller is added in an amount in the above range, the ink composition may be spotted in a favorable manner using an ink-jet method.

Examples of the surfactants include, as hydrocarbon surfactants, anionic surfactants such as fatty acid salts, alkyl sulfates, alkyl benzene sulfonates, alkyl naphthalene sulfonates, dialkylsulfosucciniates, alkyl phosphates, formalin condensates of naphthalene sulfonates, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene-oxypropylene block copolymers. Further, acetylene-type polyoxyethyleneoxide surfactants, such as SURFYNOL series (trade name, manufactured by Air Products & Chemicals, Inc.), and amine oxide-type amphoteric surfactants such as N,N-dimethyl-N-alkylamine oxide are also favorably used.

Moreover, compounds described as a surfactant in JP-A No. 59-157636, pp. 37 to 38 and Research Disclosure No. 308119 (1989) are also applicable.

The anti-abrasion properties may be improved by using fluorine (fluoroalkyl) surfactants, silicone surfactants or the like, such as those described in JP-A No. 2003-322926, 2004-325707 and 2004-309806.

The aforementioned surface-tension controller may also be used as an antifoam agent, and fluorine compounds, silicone compounds, chelate compounds such as EDTA may be used.

<Ink Set>

Treatment Liquid

The ink composition of the present invention may constitute an ink set together with a treatment liquid that containing a coagulant that coagulates components of the ink composition. The treatment liquid includes at least a coagulant that coagulates the aforementioned components of the ink composition, and optionally includes other components as necessary. By using the treatment liquid together with the ink composition, ink-jet recording can be performed at a higher speed, and an image showing excellent printing properties with high density and high resolution (including reproducibility of thin lines and minute portions) is obtained even when recording is performed at high speed.

The coagulant may be a compound that can change the pH value of the ink composition, a polyvalent metal salt, or a polymer having a quaternary amine or a tertiary amine such as polyallylamines. In the present invention, a compound that can change the pH value of the ink composition is preferable, and a compound that can decrease the pH value of the ink composition is more preferable, from the viewpoint of coagulation properties of the ink composition.

The compound that can decrease the pH value of the ink composition may be an acidic substance. Suitable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, and derivatives thereof, and salts thereof.

The acid substance may be used singly, or in combination of two or more thereof.

In the present invention, when the treatment liquid includes an acidic substance, the pH value of the treatment liquid at 25° C. is preferably 6 or less, and more preferably 4 or less. In particular, the pH value of the treatment liquid at 25° C. is preferably from 1 to 4, and particularly preferably from 1 to 3. In such a case, the pH value of the ink composition at 25° C. is preferably 7.5 or more, and more preferably 8.0 or more.

In particular, it is preferable that the pH value of the ink composition at 25° C. is 8.0 or more and the pH value of the treatment liquid at 25° C. is from 0.5 to 4, from the viewpoint of image density, resolution, and higher-speed-ink-jet recording.

In the present invention, the coagulant is preferably an acidic substance having high solubility in water, and is preferably an organic acid with a view of increasing coagulation properties and immobilizing the entire ink. The coagulant is more preferably a divalent or higher-valent organic acid, and still more preferably a divalent or trivalent acidic substance. The divalent or higher-valent organic acid is preferably an organic acid having a first pKa of 3.5 or less, and more preferably an organic acid having a first pKa of 3.0 or less. Examples thereof include phosphoric acid, oxalic acid, malonic acid, and citric acid.

Examples of the polyvalent metal salt include a salt of any of the following: an alkaline earth metal, which belongs to Group 2 of the Periodic Table, such as magnesium or calcium; a transition metal belonging to Group 3 of the Periodic Table, such as lanthanum; a metal belonging to Group 13 of the Periodic Table, such as aluminum; and a lanthanide, such as neodymium. The salt of such a metal is preferably a carboxylic acid salt (such as a formate, acetate, or benzoate), a nitrate, a chloride, or a thiocyanate. In particular, the following salts are preferable: a calcium or magnesium salt of a carboxylic acid (such as formic acid, acetic acid, or benzoic acid); a calcium or magnesium salt of nitric acid; calcium chloride; magnesium chloride; and a calcium or magnesium salt of thiocyanic acid.

The coagulant may be used singly, or in combination of two or more thereof. The content of the coagulant, which coagulates the ink composition, in the treatment liquid is preferably from 1 to 50% by mass, more preferably from 3 to 45% by mass, and still more preferably from 5 to 40% by mass.

The treatment liquid may include other additives as additional components, as long as the effects of the present invention are not impaired. Examples of other additives include known additives, such as an anti-drying agent (moistening agent), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent, and a chelating agent.

Image Recording Method

The ink-jet recording method according to the present invention uses the aforementioned ink set of the present invention, and includes: an ink applying step for applying an ink composition containing a pigment, a water-soluble polymerizable compound (A) having an acrylamide structure in the molecule, a water-soluble solvent (B), and water, in which the mass ratio of the polymerizable compound (A) and the water-soluble solvent (B) is $1/10 \leq B/A \leq 2/3$ to a recording medium by an ink-jet method and a treatment liquid applying step for applying a treatment liquid containing an aggregating agent that aggregates ingredients in the ink composition to the recording medium. The image recording method of the present invention may include one or more other steps as necessary.

According to an embodiment of the present invention in which polymer particles are used, the ink composition for forming an ink image includes a water-soluble polymerizable compound that can be cured through polymerization with the polymer particles, together with a pigment. Due to this configuration, an image is immobilized by a coagulation reaction of the pigment and/or the polymer particles when the ink composition contacts the treatment liquid. Further, the polymer particles are present between particles of the pigment, and the polymerizable compound, which is in the state of being incorporated into a space among such particles in the immobilized image, is cured through polymerization, whereby the strength of the final image is increased. In other words, using the treatment liquid, components in the ink composition are coagulated rapidly to prevent intermixing of ink droplets, such as bleeding or intercolor mixing, and, as a result, suitability for high-speed recording and effects in improving the hue and image printing properties (including reproducibility of thin lines and minute portions in an image) during high-speed recording are imparted, while the polymerizable compound enters, to an appropriate extent, into a space among the pigment particles and the polymer particles that are in a coagulated state. Since the polymerizable compound is cured through polymerization and in this state, the image strength can be improved, and a good balance between suitability for high-speed recording and improvement in the rubbing resistance of an image can be achieved.

In particular, these effects are more conspicuous when image recording is performed on a coated paper as a recording medium having a surface on which the pigment tends to remain.

In the following, the steps of the ink-jet recording method of the present invention are described.

Ink Applying Step

In the ink applying step, an ink composition containing a pigment, a water-soluble polymerizable compound (A) having an acrylamide structure in the molecule, a water-soluble solvent (B), and water, in which the mass ratio of the polymerizable compound (A) and the water-soluble solvent (B) is $1/10 \leq B/A \leq 2/3$ is applied onto a recording medium by an ink-jet method. In this step, the ink composition can be applied selectively onto the recording medium, so that a desired visible image can be formed. Details of the ink composition, such as details and preferred modes of the respective components, are the same as those described above.

Specifically, the recording of an image using an ink-jet method may be performed by jetting a liquid composition onto a desired medium to be recorded by application of energy, and the medium to be recorded is, for example, a plain paper or a resin-coated paper, a paper for ink-jet recording, a film, a paper for both ink-jet recording and electrophotographic recording, a cloth, a glass, a metal, and ceramics, as described in JP-A Nos. 8-169172, 8-27693, 2-276670, 7-276789, 9-323475, 62-238783, 10-153989, 10-217473, 10-235995, 10-337947, 10-217597, and 10-337947. An ink-jet recording method that is preferably applicable in the present invention is the method described in paragraphs [0093] to [0105] of JP-A No. 2003-306623.

The ink-jet method is not particularly limited and may be any known method such as a charge-control method in which ink is jetted by electrostatic attraction force; a drop-on-demand method (pressure-pulse method) in which a pressure of oscillation of a piezo element is utilized; an acoustic ink-jet method in which ink is jetted by radiation pressure generated by irradiation of ink with acoustic beams that have been converted from electric signals; and a thermal ink-jet method in which ink is jetted by a pressure generated by formation of bubbles caused by heating of ink (BUBBLEJET, registered trademark). An ink-jet method is described in JP-A No. 54-59936 and can be suitably used; in this method, ink is jetted from a nozzle by an acting force generated by a rapid change in volume of the ink caused by application of a thermal energy to the ink.

Further, examples of the ink-jet method include a method in which a large number of small-volume droplets of an ink having a low optical density, which is called a photo ink, are jetted; a method in which inks of substantially the same color hue at different densities are used to improve image quality; and a method in which a clear and colorless ink is used.

The ink-jet head used in an ink-jet method may be either an on-demand type head or a continuous type head. Examples of jetting systems include electromechanical transduction systems (such as a single-cavity system, a double-cavity system, a vendor system, a piston system, a share-mode system and a shared-wall system), electrothermal transduction systems (such as a thermal ink-jet system and a BUBBLE-JET (registered trademark) system), electrostatic suction systems (such as an electric-field-control system and a slit-jet system), and discharge systems (such as a spark-jet system), and any of these jetting systems is applicable.

The ink nozzles used for the ink-jet recording are not particularly limited, and may be selected as appropriate according to applications.

Specific examples of the ink-jet recording method include those described below.

(1) A method called electrostatic attraction system, in which a strong electric field is applied between a nozzle and an accelerating electrode disposed in front of the nozzle so as to successively jet ink droplets from the nozzle, print information signals are supplied to deflection electrodes while the ink droplets pass a gap between the deflection electrodes so that the ink droplets are jetted towards a recording medium, and the ink is fixed on the recording medium to record an image, or in which ink droplets are jetted from a nozzle towards a recording medium, without being deflected, according to print information signals and an image is thereby fixed on the recording medium (2) A method in which a pressure is applied to an ink liquid by a small-sized pump and an ink-jet nozzle is mechanically vibrated using a crystal oscillator or the like, thereby forcibly jetting ink droplets from the nozzle. The ink droplets jetted from the nozzle is electrically charged simultaneously with the jetting, and print information signals are supplied to deflection electrodes while the ink droplets pass a gap between the deflection electrodes so as to jet the ink droplets towards a recording medium, and an image is thereby recorded on the recording medium.

(3) A piezo method in which pressure and print information signal are simultaneously applied to an ink liquid by a piezoelectric device, so that ink droplets are jetted from a nozzle towards a recording medium and an image is thereby recorded on the recording medium.

(4) A BUBBLE-JET (registered trademark) method, in which an ink liquid is heated and bubbled by a microelectrode according to print signal information, and the bubbles are allowed to expand so that the ink liquid is jetted from a nozzle towards a recording medium and an image is thereby recorded on the image recording medium.

Regarding the ink-jet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned. As a result, a conveyance system, such as carriage which moves a short head in a scanning manner is unnecessary. Further, since a complicated scan-movement control of the movement of the carriage and the recording medium is unnecessary and only the recording medium is moved, the recording speed can be increased compared to the shuttle system. The ink-jet recording method of the present invention can be applied to both of these systems; effects of improving both jetting accuracy and rubbing resistance of an image are larger when the ink-jet recording method of the present invention is applied to a line system, in which dummy jetting is not generally performed.

The amount of ink per one drop jetted from an ink-jet head is preferably from 1 pl to 10 pl (picoliter), and more preferably from 1.5 pl to 6 pl, from the viewpoint of obtaining a high-precision image. It is also effective to jet liquid droplets of different quantities in combination, with a view to suppressing unevenness in an image and improving smoothness in continuous gradation. The present invention is effective also in such an embodiment.

Treatment-Liquid Applying Step

In the treatment-liquid applying step, a treatment liquid containing a coagulant that coagulates components in the ink composition and a water-soluble polymerizable compound that undergoes polymerization when irradiated with an active energy radiation is applied to a recording medium, and the treatment liquid is brought into contact with the ink composition, thereby forming an image. In this process, dispersed particles in the ink composition, such as the pigment and the polymer particles, are aggregated, whereby the image is immobilized onto the recording medium. The treatment liquid includes at least a coagulant, and details and preferred modes of the respective components are the same as those described above.

Application of the treatment liquid can be performed using a known method, such as a coating method, an ink-jet method, or an immersion method. The coating method may be a known coating method using a bar coater, an extrusion die coater, an air doctor coater, a blade coater, a rod coater, a knife coater, a squeeze coater, a reverse roll coater, or the like. Details of the ink-jet method are the same as those described above.

The treatment-liquid applying step may be performed before or after the ink applying step using the ink composition. In the present invention, it is preferable to perform the ink applying step after the treatment liquid is applied in the treatment-liquid applying step. Specifically, in a preferable embodiment, the treatment liquid for aggregating the pigment and/or the polymer particles in the ink composition is applied on the recording medium prior to applying the ink composition, and the ink composition is applied so as to contact with the treatment liquid provided on the recording medium, whereby an image is formed. As a result, ink-jet recording can be performed at higher speed, and an image having high density and resolution is obtained even when recording is performed at high speed.

The amount of the treatment liquid to be applied is not particularly limited as long as the ink composition can be coagulated, and is preferably 0.1 g/m$^2$ or more in terms of the amount of applied coagulant. The amount of the applied coagulant is more preferably from 0.2 to 0.7 g/m$^2$. When the amount of the applied coagulant is 0.1 g/m$^2$ or more, superior high-speed coagulation properties that accord with various modes of the use of the ink-jet composition are maintained. A coagulant application amount of 0.7 g/m$^2$ or less is preferable in that disadvantageous influences, such as change in gloss, are not given to the surface properties of the recording medium to which the treatment liquid is applied.

In the present invention, it is preferable that the ink applying step is performed after the treatment-liquid applying step and a heat-drying step of drying the treatment liquid on the recording medium by heating is performed during a period after the application of the treatment liquid onto a recording medium until the application of the ink composition. By drying the treatment liquid by heating prior to the ink applying step, the ink receiving properties, including suppression of bleeding, are improved, and a visible image having superior color density and hue can be recorded.

The drying by heating may be performed with a known heating means, such as a heater, or a heating means utilizing blowing of air, such as a drier, or a means having a combination thereof. Examples of the heating method include: a method of supplying heat from the side of the recording medium opposite to the surface on which the treatment liquid has been applied, using a heater or the like; a method of blowing a warm or hot air to the surface of the recording medium on which the treatment liquid has been applied; a heating method using an infrared heater; and a combination of two or more of the above methods.

Recording Medium

According to the ink-jet recording method of the present invention, an image is recorded on a recording medium.

The recording medium is not particularly limited, and may be a cellulose-based general printing paper, such as high-quality paper, coat paper, or art paper, which is used for general offset printing and the like. When image recording is performed on the cellulose-based general printing paper by a general ink-jet method using an aqueous ink, absorption and drying of the ink is relatively slow, colorant migration easily occurs after ink spotting, and image quality tends to lower. In contrast, according to the ink-jet recording method of the present invention, a high-quality image recording having excellent color density and hue is achieved while suppressing the migration of the colorant.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI JO-SHITSU (New NPI high-quality; trade name) manufactured by Nippon Paper Industries Co., Ltd.; very light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd. As the recording medium, various ink-jet-recording papers exclusively for photos may be used.

Among the recording media, coated paper, which is used for general offset printing, is preferable. The coated paper is produced generally by coating a surface of cellulose-based paper (such as high-quality paper or neutral paper), which has not been subjected to surface treatment, with a coating material so as to form a coating layer. When image forming is performed by usual water-based ink-jet, the coated paper tends to produce problems in quality, in terms of, for example, image gloss or rubbing resistance. In contrast, according to the ink-jet recording method of the present invention, unevenness in gloss is suppressed and an image having excellent gloss and rubbing resistance can be obtained according to the ink-jet recording method of the present invention even when the coated paper is used. In particular, it is preferable to use a coated paper having base paper and a coated layer including an inorganic pigment and it is more preferable to use a coated paper having base paper and a coated layer including kaolin and/or calcium bicarbonate. Specifically, art paper, coat paper, lightweight coat paper, or very light-weight coat paper is preferable.

Ink-Jet Recording Apparatus

Next, an example of an ink-jet recording apparatus favorably used for the image recording method of the present invention will be explained in detail with reference to FIG. 1.

FIG. 1 is a schematic view showing an example of a structure of the entire ink-jet recording apparatus.

As shown in FIG. 1, the ink-jet recording apparatus includes: treatment liquid application unit 12, having treatment liquid jetting head 12S that jets the treatment liquid; treatment liquid drying zone 13, having heating unit (not shown) that dries the applied treatment liquid; and ink-jetting unit 14 that jets various ink compositions; and ink drying zone 15 at which the jetted ink composition is dried, in this order in the conveyance direction of the recording medium (the direction of the arrow shown in the figure). Further, UV ray irradiation unit 16, having UV ray irradiation lamp 16S, is provided downstream of ink drying zone 15 in the conveyance direction of the recording medium.

The recording medium that has been supplied to the ink-jet recording apparatus is conveyed by conveyance rollers from a feed section to treatment liquid application unit 12, then to treatment liquid drying zone 13, then to ink-jetting unit 14, then to ink drying zone 15, and then to UV ray irradiation unit 16, and then accumulated in an accumulation section. The feed section feeds sheets of the recording medium from a case in which the sheets are loaded. The conveyance of the recording medium may be conducted by a method other than the method using conveyance rollers, and examples thereof include a drum conveyance method using a drum-shaped member, a belt conveyance method, or a stage conveyance method using a stage.

Among the plural conveyance rollers provided in the ink-jet recording apparatus, at least one roller may be a drive roller to which the force generated by a motor (not shown) is transmitted. By rotating the drive roller at a constant rate using the motor, the recording medium is conveyed in a predetermined direction at a predetermined conveyance amount.

Treatment liquid application unit 12 has treatment liquid jetting head 12S, which is connected to a storage tank in which the treatment liquid is stored. Treatment liquid jetting head 12S jets the treatment liquid from jetting nozzles disposed to face the recording surface of the recording medium so that droplets of the treatment liquid can be applied onto the recording medium. The method used in treatment liquid application unit 12 is not limited to a method of jetting from a head in the form of a nozzle, and may be a coating method using a coating roller. According to the coating method, the treatment liquid may be readily applied to almost the entire one surface of the recording medium, including an image portion on which ink droplets are to be spotted by ink-jetting unit 14 provided at the downstream side. In order to make uniform the thickness of the treatment liquid applied onto the recording medium, an air-knife may be used, or a method of providing a member having an acute angle to give a gap between the member and the recording medium that corresponds to the predetermined amount of treatment liquid.

Treatment liquid drying zone 13 is positioned downstream of treatment liquid application unit 12 in the conveyance direction of the recording medium. Treatment liquid drying zone 13 may include: a known heating means such as a heater; an air blower such as a drier; or a combination thereof. The heating may be conducted by a method of disposing a heat-generating member, such as a heater, at a side of the recording medium opposite to the surface applied with treatment liquid wherein, if the recording medium is conveyed automatically, the heat-generating member may be positioned, for example, below the conveyance system that conveys the recording medium placed thereon; or by a method of blowing warm or hot air onto the surface of the recording medium applied with treatment liquid; or by a method of using an infrared heater. Any of these methods may be used singly, or in combination of two or more thereof.

Since the surface temperature of the recording medium may vary depending on the type (material, thickness and the like) of the recording medium and the environmental temperature, it is preferable to dry the treatment liquid while regulating the surface temperature by using a system including a measurement section that measures the surface temperature of the recording medium and a control section that provides the heating control unit with feedback on the temperature measured by the measurement section. The measurement section for measuring the surface temperature of the recording medium is preferably a contact-type or non-contact type thermometer.

The solvent may be removed using, for example, a solvent-removing roller. Alternatively, a method in which excess solvent is removed from the recording medium by an air knife is also applicable.

Ink-jetting unit 14 is positioned downstream of treatment liquid drying zone 13 with respect to the conveyance direction of the recording medium. Ink-jetting unit 14 includes recording heads (ink-jetting heads) 30K, 30C, 30M and 30Y, which are connected to ink reservoirs that store inks of black (K), cyan (C), magenta (M) and yellow (Y), respectively. Each ink reservoir (not shown) stores an ink composition containing a pigment of a corresponding color, resin particles, water-soluble organic solvent and water, and supplies the ink to the corresponding head among ink-jetting heads 30K, 30C, 30M and 30Y, as necessary, when image recording is performed. Further, as shown in FIG. 1, recording heads 30A and 30B for jetting inks of specific colors may be further provided, which are positioned downstream of ink-jetting heads 30K, 30C, 30M and 30Y with respect to the conveyance direction of the recording medium, such that recording heads 30A and 30B jet the inks having specific colors as necessary.

Ink-jetting heads 30K, 30C, 30M and 30Y jet inks in a manner corresponding to the image to be formed, through jetting nozzles that are positioned so as to face the recording surface of the recording medium. In this way, inks of the respective colors are applied to the recording surface of the recording medium to form a color image.

Treatment liquid jetting head 12S and ink-jetting heads 30K, 30C, 30M, 30Y, 30A and 30B are each in the form of full-line head in which a number of jetting ports (nozzles) are aligned along the maximum recording width of the image to be formed on the recording medium. In this form, image recording on a recording medium can be carried out at higher speed compared to serial-type recording in which recording is carried out using a short-length shuttle head that reciprocates in the width direction of the recording medium (in a direction on the plane of the recording medium that is perpendicular to the conveyance direction of the recording medium) in a scanning manner. In the present invention, either of the above serial-type recording method or a recording method capable of recording at relatively high speed, such as a single-path system in which an image is formed in one scanning-movement by jetting using a line head while moving the recording medium relative to the line head in the fast scanning direction, may be employed. In the image recording method of the present invention, a high-quality image having high reproducibility may be obtained even in the single-path system.

In the figure, treatment liquid jetting head 12S and ink-jetting heads 30K, 30C, 30M, 30Y, 30A and 30B have the same structure.

The application amount of the treatment liquid and the application amount of the ink composition are preferably regulated in accordance with the necessity. For example, the amount of the treatment liquid may be changed according to the type of the recording medium, in order to, for example, adjust the properties such as viscoelasticity of the aggregates formed upon mixing of the treatment liquid and the ink composition.

Ink drying zone 15 is positioned downstream of ink-jetting unit 14 in the conveyance direction of the recording medium. Ink drying zone 15 may have a structure similar to that of treatment liquid drying zone 13.

UV ray irradiation unit 16 is disposed further downstream of ink drying zone 15 in the conveyance direction of the recording medium, and emits UV rays from UV ray irradiation lamp 16S provided in UV ray irradiation unit 16, thereby curing through polymerization of the monomer components contained in an image after drying of the image. UV ray irradiation lamp 16S is a lamp which is disposed to oppose the recording surface of the recording medium, and with which the entire recording surface is irradiated to cure the entire image. The lamp used in UV ray irradiation unit 16 is not limited to UV ray irradiation lamp 16S, and it is also possible to use a halogen lamp, a high-pressure mercury lamp, a laser, a LED, an electron-beam irradiation device, or the like.

The UV ray irradiation unit 16 may be disposed before or after the ink drying zone 15 and may be disposed both before and after the ink drying zone 15.

The ink-jet recording apparatus may further include a heating unit at the conveyance path from the feed section to the accumulation section, in order to conduct a heat treatment on the recording medium. For example, by providing a heating unit at a desired position, such as upstream of treatment liquid drying zone 13 or between ink-jetting unit 14 and ink drying zone 15, the temperature of the recording medium can be increased to a desired temperature, at which drying and fixing is performed effectively.

According to aspects of the present invention, there are provided the following ink compositions, ink sets and image forming methods. However, the present invention is not limited thereto.

<1> An ink composition including: a pigment, a water-soluble polymerizable compound (A) having an acrylamide structure in a molecule thereof, a water-soluble solvent (B), and water, in which a mass ratio of the polymerizable compound (A) and the water-soluble solvent (B) satisfies $1/10 \leq B/A \leq 2/3$.

<2> The ink composition according to the above-described item <1>, in which an SP value of the polymerizable compound (A) is in the range of from 9 to 11.5 $(cal/cm^3)^{0.5}$.

<3> The ink composition according to the above-described item <1> or <2>, in which the polymerizable compound (A) is represented by the above-described Formula (1).

<4> The ink composition according to any one of the above-described items <1> to <3>, in which an SP value of the water-soluble solvent (B) is in the range of from 9 to 13.5 $(cal/cm^3)^{0.5}$.

<5> The ink composition according to any one of the above-described items <1> to <4>, in which the pigment is a water dispersible pigment, at least one portion of the surface of which is covered with a polymer dispersant.

<6> The ink composition according to the above-described item <5>, in which the polymer dispersant has a carboxyl group.

<7> The ink composition according to the above-described item <5> or <6>, in which the polymer dispersant has an acid value of 100 mgKOH/g or lower.

<8> An ink set containing the ink composition according to any one of the above-described items <1> to <7> and a treatment liquid containing an aggregating agent that aggregates ingredients in the ink composition.

<9> The ink set according to the above-described item <8>, in which the aggregating agent is an organic acid.

<10> The ink set according to the above-described item <8> or <9>, in which at least one of the ink composition or the treatment liquid further contains an initiator that initiates polymerization of the polymerizable compound by an active energy ray.

<11> An image forming method including an ink applying step for applying an ink composition containing a pigment, a water-soluble polymerizable compound (A) having an acrylamide structure in a molecule thereof, a water-soluble solvent (B), and water, in which a mass ratio of the polymerizable compound (A) and the water-soluble solvent (B) satisfies $1/10 \leq B/A \leq 2/3$, to a recording medium by an ink-jet method and a treatment liquid applying step for applying a treatment liquid, containing an aggregating agent that aggregates ingredients in the ink composition, to the recording medium.

<12> The image forming method according to the above-described item <11>, in which the recording medium is a coated paper containing a base paper and a coat layer containing an inorganic pigment.

According to the above-described item <1>, there is provide an ink composition that can achieve excellent effects in terms of ejection stability (recovery from leaving) in a case in which ejection of the ink composition is stopped, and then after a head is left as it is for a given period of time, the ejection is re-started on an ink-jet recording device as well as excellent image curing properties and blocking resistance.

According to the above-described item <2>, there is provide an ink composition that can achieve further improvement of the above-described effects.

According to the above-described item <3>, there is provide an ink composition that can achieve further improvement of the above-described effects.

According to the above-described item <4>, there is provide an ink composition that can achieve further improvement of the above-described effects.

According to the above-described item <5>, there is provide an ink composition that can disperse the pigments stably in an aqueous medium.

According to the above-described item <6>, there is provide an ink composition that can improve a coagulation speed at the time when the polymer dispersant contacts a treatment liquid.

According to the above-described item <7>, there is provide an ink composition that can improve a coagulation speed at the time when the polymer dispersant contacts a treatment liquid.

According to the above-described item <8>, there is provide an ink set that can achieve excellent effects in terms of ejection stability (recovery from leaving) in a case in which ejection of the ink composition is stopped, and then after a head is left as it is for a given period of time, the ejection is re-started on an ink-jet recording device as well as excellent image curing properties and blocking resistance, and further can produce effects such that ink-jet recording can be performed at higher speed, and an image showing excellent printing properties with high density and high resolution (including reproducibility of thin lines and minute portions) can be obtained even when recording is performed at high speed.

According to the above-described item <9>, there is provide an ink set that can achieve further improvement of coagulation properties and immobilization of the ink.

According to the above-described item <10>, there is provide an ink set that can achieve further improvement of coagulation properties and immobilization of the ink.

According to the above-described item <11>, there is provide an image forming method that can achieve excellent effects in terms of ejection stability (recovery from leaving) in a case in which ejection of the ink composition is stopped, and then after a head is left as it is for a given period of time, the ejection is re-started on an ink-jet recording device as well as excellent image curing properties and blocking resistance, and further can produce effects such that ink-jet recording can be performed at higher speed, and an image showing excellent printing properties with high density and high resolution (including reproducibility of thin lines and minute portions) can be obtained even when recording is performed at high speed.

According to the above-described item <12>, there is provide an image forming method that can achieve excellent effects in terms of suppressed unevenness in gloss and an image having excellent gloss and rubbing resistance.

EXAMPLES

In the following, the present invention will be described in further details with reference to the examples. However, the present invention is not limited to these examples as long as the gist of the invention is retained. Moreover, the term "part" refers to "part by mass" unless otherwise noted.

Preparation of Aqueous Ink
Preparation of Ink 1 (Cyan Ink)
Preparation of Polymer Dispersant 1 Liquid 6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by NOF Corporation), 5 parts of methacrylic acid, 0.05 parts of 2-mercaptoethanol, and 24 parts of methyl ethyl ketone were added into a reaction vessel to prepare a mixed solution.

Separately, 14 parts of styrene, 24 parts of stearyl methacrylate, 9 parts of styrene macromer AS-6 (trade name, manufactured by Toagosei Co., Ltd.), 9 parts of BLEMMER PP-500 (trade name, manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added into a dripping funnel to prepare a mixed solution.

In a nitrogen atmosphere, the mixed solution in the reaction vessel was heated to 75° C. while stirring, and the mixed solution in the dripping funnel was gradually dripped into the reaction vessel over one hour. Two hours after the completion of the dripping, 12 parts of methyl ethyl ketone in which 1.2 parts of 2,2'-azobis(2,4-dimethylvaleronitrile) was dissolved was dripped into the reaction vessel over three hours. The mixed solution was further aged at 75° C. for two hours and then at 80° C. for two hours, thereby obtaining a polymer dispersant 1 solution.

The weight average molecular weight of the polymer in the obtained polymer dispersant 1 solution was measured in the following manner. A part of the polymer dispersant 1 solution was isolated by removing the solvent, and the obtained solid content was diluted with tetrahydrofuran to 0.1 mass % to obtain a sample. The sample was subjected to high-speed GPC (gel permeation chromatography) using HLC-8220 GPC (columns: TSKgeL Super HZM-H, TSKgeL Super HZ4000, and TSKgeL Super HZ2000 (all trade names, manufactured by TOSOH CORPORATION) connected in series). The weight average molecular weight of the polymer as measured was 25,000 (as a polystyrene-equivalent value), and the acid value of the polymer was found to be 99 mgKOH/g.

Preparation of Cyan Dispersion Liquid

Next, 5.0 g (in terms of solid content) of the obtained polymer dispersant solution, 10.0 g of a cyan pigment (Pigment Blue 15:3, manufactured by Dainichiseika Color & Chemicals Mfg. Co., Ltd.), 40.0 g of methyl ethyl ketone, 8.0 g of 1 mol/L (liter) sodium hydroxide, and 82.0 g of ion exchange water were put in a vessel together with 300 g of 0.1 mm zirconia beads, and were dispersed for 6 hours at 1,000 rpm with a disperser Ready Mill (trade name, manufactured by Aimex Co., Ltd.). The resulting dispersion liquid was condensed under reduced pressure using an evaporator until methyl ethyl ketone was sufficiently removed, and the dispersion liquid was further condensed until the concentration of pigment reached 10%. Cyan pigment dispersion liquid C1 was thus obtained, in which the water-dispersible pigment was dispersed.

The volume average particle diameter (of the secondary particles) of the cyan dispersion liquid C1 as measured by a dynamic light scattering method using a particle size distribution meter MICROTRAC Version 10.1.2-211 BH (trade name, manufactured by Nikkiso Co., Ltd.) was 77 nm.

Synthesis of Fine Particles of Self-Dispersing Polymer1

360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of V-601 (tradename, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature was increased to 85° C., and stirring was continued for another 2 hours. As a result, a resin solution of a copolymer of phenoxyethyl acrylate/methyl methacrylate/acrylic acid (in a ratio of 50/45/5 by mass) was obtained.

The weight average molecular weight (Mw) of the obtained copolymer as measured in a similar manner to the above polymer dispersant was 64000 (calculated as polystyrene-equivalent value according to gel permeation chromatography (GPC)). The acid value of the copolymer was found to be 38.9 mgKOH/g.

Then, 668.3 g of the obtained resin solution was weighed, and 388.3 g of isopropanol and 145.7 ml of a 1 mol/L NaOH aqueous solution were added to the resin solution, and then the temperature inside the reaction vessel was elevated to 80° C. Thereafter, 720.1 g of distilled water was added dropwise into the reaction vessel at a rate of 20 ml/min so as to form water dispersion. The contents of the reaction vessel was allowed to stand, under atmospheric pressure, at a reaction vessel inside temperature of 80° C. for 2 hours, and then 85° C. for 2 hours, and then 90° C. for 2 hours. Subsequently, the pressure inside of the reaction vessel was reduced, and the isopropanol, the methyl ethyl ketone, and the distilled water were removed in a total amount of 913.7 g. As a result, a water dispersion of self-dispersing polymer fine particles 1 having a solid concentration of 28.0% by mass was obtained.

Synthesis of Polymerizable Compound 1

In a 1 L three-necked flask having a stirrer, 40.0 g (182 mmol) of 4,7,10-trioxa-1,13-tridecanediamine, 37.8 g (450 mmol) of sodium bicarbonate, 100 g of water, and 300 g of tetrahydrofuran were placed, and then 35.2 g (389 mmol) of acrylic acid chloride was added dropwise over 20 minutes under ice bath cooling. After the dropwise addition, the mixture was stirred at room temperature for 5 hours, and then the tetrahydrofuran was distilled off from the obtained reaction mixture under reduced pressure. Next, the aqueous layer was extracted 4 times with 200 ml of ethyl acetate, the obtained organic layer was dried over magnesium sulfate, filtration was performed, and the solvent was distilled off under reduced pressure, thereby obtaining 35.0 g (107 mmol, 59% yield) of a solid of the target polymerizable compound 1.

After the cyan dispersion liquid C1 was prepared as described above, the cyan dispersion liquid C1 was mixed with the water dispersion of self-dispersing polymer fine particles 1, the above-described polymerizable compound 1, an organic solvent, a surfactant, and ion-exchange water, so that an ink having the following composition was prepared. After the preparation of the ink, the ink was filtered through a 5 μm filter so as to remove coarse particles, whereby a cyan ink was obtained.

Composition of Cyan Ink 1

| Formulation of Ink 1 | |
|---|---|
| Cyan dispersion liquid C1 | 4.35% by mass (solid content) |
| Water dispersion of self-dispersing polymer particles 1 | 2% by mass |
| Polymerizable compound 1 | 11% by mass |
| Diethylene glycol monoethyl ether (DEGmEE, manufactured by Wako Pure Chemical Industries, Ltd.) | 7.15% by mass |
| OLFINE E1010 (trade name, manufactured by Nisshin Chemical Co., Ltd.) | 1% by mass |
| Initiator (IRGACURE 2959 (trade name, manufactured by Ciba Specialty Chemicals Corporation, Japan) | 3% by mass |
| Ion exchanged water | Balance (Added to be 100% by mass in total) |

Porimerizable Compound I

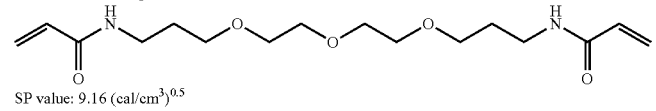

SP value: 9.16 (cal/cm$^3$)$^{0.5}$

Preparation of Inks 2 to 15

Inks 2 to 15 were produced in the same manner as in the ink 1 according to the formulation (unit: % by mass) shown in Table 1. The ink 12 was prepared in the same manner as in the above described Preparation of ink 1, except that a magenta dispersion liquid M1 was prepared by changing the pigment in the Preparation of ink 1 to PR-122 (Pigment Red 122). In each formulation, ion exchanged water was added in addition to these ingredients in the quantity so that the total amount was 100% by mass.

In Table 1, the details of the water-soluble solvents are as follows. The number at the right side in the brackets is an SP value of each solvent.

DEGmEE (Diethylene glycol monoethyl ether, 11.0)
TPGmME (Tripropylene glycol monomethyl ether, 9.4)
DEG (Diethylene glycol, 14.5)
SANNIX GP250 (trade name, manufactured by Sanyo Chemical Industries, Ltd.; hydrophilic organic solvent, 10.6)
1,2-hexanediol (13.4)

TABLE 1

| Ink 1 | |
|---|---|
| Cyan dispersion liquid C1 | 4.35 (solid content) |
| Self-dispersing polymer particles 1 | 2 |
| Polymerizable compound 1 | 11 |
| DEGmEE | 7.15 |
| OLFINE E1010 | 1 |
| IRGACURE 2959 | 3 |
| Ion exchanged water | Balance |
| B/A | 0.65 |
| Present invention | |

| Ink 2 | |
|---|---|
| Cyan dispersion liquid C1 | 4.35 (solid content) |
| Self-dispersing polymer particles 1 | 2 |
| Polymerizable compound 1 | 11 |
| DEGmEE | 5.5 |
| OLFINE E1010 | 1 |
| IRGACURE 2959 | 3 |
| Ion exchanged water | Balance |
| B/A | 0.5 |
| Present invention | |

| Ink 3 | |
|---|---|
| Cyan dispersion liquid C1 | 4.35 (solid content) |
| Self-dispersing polymer particles 1 | 2 |
| Polymerizable compound I | 11 |
| DEGmEE | 1.1 |
| OLFINE E1010 | 1 |
| IRGACURE 2959 | 3 |
| Ion exchanged water | Balance |
| B/A | 0.1 |
| Present invention | |

| Ink 4 | |
|---|---|
| Cyan dispersion liquid C1 | 4.35 (solid content) |
| Self-dispersing polymer particles 1 | 2 |
| Polymerizable compound 2 | 11 |
| DEGmEE | 5.5 |
| OLFINE E1010 | 1 |
| IRGACURE 2959 | 3 |
| Ion exchanged water | Balance |
| B/A | 0.5 |
| Present invention | |

| Ink 5 | |
|---|---|
| Cyan dispersion liquid C1 | 4.35 (solid content) |
| Self-dispersing polymer particles 1 | 2 |
| Polymerizable compound 3 | 11 |
| DEGmEE | 6.5 |
| OLFINE E1010 | 1 |
| IRGACURE 2959 | 3 |
| Ion exchanged water | Balance |
| B/A | 0.59 |
| Present invention | |

TABLE 1-continued

| Ink 6 | |
|---|---|
| Cyan dispersion liquid C1 | 4.35 (solid content) |
| Self-dispersing polymer particles 1 | 2 |
| Polymerizable compound 4 | 11 |
| DEGmEE | 3.5 |
| OLFINE E1010 | 1 |
| IRGACURE 2959 | 3 |
| Ion exchanged water | Balance |
| B/A | 0.32 |
| Present invention | |

| Ink 7 | |
|---|---|
| Cyan dispersion liquid Cl | 4.35 (solid content) |
| Self-dispersing polymer particles 1 | 2 |
| Polymerizable compound 1 | 11 |
| DEGmEE | 5.5 |
| OLFINE E1010 | 1 |
| IRGACURE 2959 | 3 |
| Ion exchanged water | Balance |
| B/A | 0.5 |
| Present invention | |

| Ink 8 | |
|---|---|
| Cyan dispersion liquid C1 | 4.35 (solid content) |
| Self-dispersing polymer particles 1 | 2 |
| Polymerizable compound 1 | 11 |
| TPGmME | 5.5 |
| OLFINE E1010 | 1 |
| IRGACURE 2959 | 3 |
| Ion exchanged water | Balance |
| B/A | 0.5 |
| Present invention | |

| Ink 9 | |
|---|---|
| Cyan dispersion liquid C1 | 4.35 (solid content) |
| Self-dispersing polymer particles 1 | 2 |
| Polymerizable compound 1 | 11 |
| DEG | 5.5 |
| OLFINE E1010 | 1 |
| IRGACURE 2959 | 3 |
| Ion exchanged water | Balance |
| B/A | 0.5 |
| Present invention | |

| Ink 10 | |
|---|---|
| Cyan dispersion liquid C1 | 4.35 (solid content) |
| Self-dispersing polymer particles 1 | 2 |
| Polymerizable compound 1 | 9 |
| SANNIX GP250 | 5.5 |
| OLFINE E1010 | 1 |
| IRGACURE 2959 | 3 |
| Ion exchanged water | Balance |
| B/A | 0.61 |
| Present invention | |

| Ink 11 | |
|---|---|
| Cyan dispersion liquid C1 | 4.35 (solid content) |
| Self-dispersing polymer particles 1 | 2 |
| Polymerizable compound 1 | 11 |
| 1,2-hexanediol | 5.5 |
| OLFINE E1010 | 1 |
| IRGACURE 2959 | 3 |
| Ion exchanged water | Balance |
| B/A | 0.5 |
| Present invention | |

| Ink 12 | |
|---|---|
| Magenta dispersion liquid M1 | 4.35 (solid content) |
| Self-dispersing polymer particles 1 | 2 |
| Polymerizable compound 1 | 11 |
| DEGmEE | 5.5 |
| OLFINE E1010 | 1 |
| IRGACURE 2959 | 3 |
| Ion exchanged water | Balance |
| B/A | 0.5 |

TABLE 1-continued

| Present invention Ink 13 | |
| --- | --- |
| Cyan dispersion liquid C1 | 4.35 (solid content) |
| Self-dispersing polymer particles 1 | 2 |
| Polymerizable compound 1 | 11 |
| DEGmEE | 0.88 |
| OLFINE E1010 | 1 |
| IRGACURE 2959 | 3 |
| Ion exchanged water | Balance |
| B/A | 0.08 |

| Comparative Example Ink 14 | |
| --- | --- |
| Cyan dispersion liquid C1 | 4.35 (solid content) |
| Self-dispersing polymer particles 1 | 2 |
| Polymerizable compound 1 | 11 |
| DEGmEE | 7.7 |
| OLFINE E1010 | 1 |
| IRGACURE 2959 | 3 |
| Ion exchanged water | Balance |
| B/A | 0.7 |

| Comparative Example Ink 15 | |
| --- | --- |
| Cyan dispersion liquid C1 | 4.35 (solid content) |
| Self-dispersing polymer particles 1 | 2 |
| Polymerizable compound 5 | 11 |
| DEGmEE | 5.5 |
| OLFINE E1010 | 1 |
| IRGACURE 2959 | 3 |
| Ion exchanged water | Balance |
| B/A | 0.5 |
| Comparative Example | |

Porimerizable Compound 2

$$H_2C-O-(CH_2CH_2-O)_3-CH_2-NHCO-CH=CH_2$$
$$HC-O-(CH_2CH_2-O)_3-CH_2-NHCO-CH=CH_2$$
$$H_2C-O-(CH_2CH_2-O)_3-CH_2-NHCO-CH=CH_2$$

SP value: 9.5 $(cal/cm^3)^{0.5}$

Porimerizable Compound 3

$$C-(-H_2C-O-(CH_2CH_2-O)_3-CH_2-NHCO-CH=CH_2)_4$$

SP value: 9.7 $(cal/cm^3)^{0.5}$

Porimerizable Compound 4

[structure]

SP value: 11.2 $(cal/cm^3)^{0.5}$

Porimerizable Compound 5 (Comparative Compound)

[structure]

n = 9
SP value: 9.2 $(cal/cm^3)^{0.5}$
A-400 (trade name, manufactured by Shin-Nakamula Chemical Co., Ltd.)

The polymerizable compound 2 and the polymerizable compound 3 can be synthesized according to the above-described synthesis of polymerizable compound 1.

Preparation of Aqueous Treatment Liquid

A treatment liquid was prepared as follow.

Preparation of Treatment Liquid 1

A treatment liquid 1 was prepared by mixing the ingredients of the following composition. Viscosity, surface tension and pH (25° C.) of the treatment liquid 1 were as follows: viscosity of 2.5 mPa·s, surface tension of 40 mN/m, and pH of 1.0.

The surface tension was measured using a full automatic surface tension meter CBVP-Z (trade name, manufactured by Kyowa Interface Science Co., LTD. and the viscosity was measured using DV-III Ultra CP (trade name, manufactured by Brookfield Engineering Laboratories Inc.) The pH was measured using a pH meter HM-30R (trade name, manufactured by Toa DKK Co., Ltd).

| Composition of treatment liquid 1 | |
| --- | --- |
| Malonic acid (manufactured by Wako Pure Chemical Industries, Ltd.) | 25% by mass |
| Diethyleneglycol monomethyl ether (manufactured by Wako Pure Chemical Industry Ltd.) | 20.0% by mass |
| EMULGEN P109 (trade name, manufactured by Kao Corporation; nonionic surfactant) | 1.0% by mass |
| Ion exchanged water | 54% by mass |

Preparation of Treatment Liquid 2

A treatment liquid 2 was prepared by mixing the ingredients of the following composition. Viscosity, surface tension and pH (25° C.) of the treatment liquid 2 when measured in the same manner as above-described treatment liquid 1 were as follows: viscosity of 2.5 mPa·s, surface tension of 40 mN/m, and pH of 1.0.

| Composition of treatment liquid 2 | |
| --- | --- |
| Malonic acid (manufactured by Wako Pure Chemical Industries, Ltd.) | 25% by mass |
| Diethyleneglycol monomethyl ether (manufactured by Wako Pure Chemical Industry Ltd.) | 20.0% by mass |
| EMULGEN P109 (trade name, manufactured by Kao Corporation; nonionic surfactant) | 1.0% by mass |
| IRGACURE 2959 (trade name, manufactured by Ciba Specialty Chemicals; photoinitiator) | 1.0% by mass |

Ion exchanged water 53% by mass

Image Recording and Evaluation

The inks and the aqueous treatment liquids were used in the combinations shown in Table 2 below, and images were recorded as described below. The recorded images were evaluated with respect to recovery from leaving, curing property and bleeding resistance according to the below-described method. The evaluation results are shown in Table 2 set forth below.

Image Recording

First, an ink-jet apparatus was prepared in which, as shown in FIG. 1, treatment liquid application unit 12 equipped with treatment liquid jetting head 12S that jets an aqueous treatment liquid, treatment liquid drying zone 13 that dries the applied aqueous treatment liquid, ink-jetting unit 14 that jets various aqueous inks, ink drying zone 15 that dries the applied aqueous ink, and UV ray irradiation unit 16 equipped with UV ray irradiation lamp 16S capable of irradiating UV rays are provided sequentially in the conveyance direction of the recording medium (the direction of the arrow shown in the figure).

Although not shown in the figure, treatment liquid drying zone 13 has an air blower at the recording surface side of the recording medium that supplies dry air so as to dry the treatment liquid, and an infrared heater at the non-recording surface of the recording medium. Treatment liquid drying zone 13 is configured such that at least 70% by mass of the water contained in the aqueous treatment liquid is evaporated (dried) off during a period until 900 msec has passed after the application of the treatment liquid is started at the treatment liquid application unit, by regulating the temperature and air volume. In ink-jetting unit 14, black-ink-jetting head 30K, cyan-ink-jetting head 30C, magenta-ink-jetting head 30M, and yellow-ink-jetting head 30Y are disposed in this order in the conveyance direction (the direction of the arrow). Each of the heads is a 1200 dpi/10 inch-wide full-line head having a driving frequency of 25 kHz and a recording medium conveyance velocity of 530 mm/sec. The respective heads are configured to jet inks of respective colors in a single-pass manner while moving in the fast scanning direction relative to the recording medium.

The treatment liquid and ink prepared above were placed into storage tanks (not shown in the figure) respectively connected to treatment jetting head 12S and cyan ink-jetting head 30C of the ink-jet apparatus that was configured as shown in FIG. 1, and a solid image and a 1200 dpi line image were recorded on a recording medium. The amount of the aqueous treatment liquid applied to the recording medium was set to be 5 ml/m². As the recording medium, U-LITE (basis weight of 84.7 g/m²), (trade name, manufactured by Nippon Paper Industries Co., Ltd.) was used.

During the image recording, the aqueous treatment liquid and the cyan ink were jetted at a resolution of 1200 dpi×600 dpi and an ink amount per droplet of 3.5 pl. The line image was recorded by jetting in a single-pass manner so as to form a line of 1200 dpi having a thickness of 1 dot, a line of 1200 dpi having a thickness of 2 dots, and a line of 1200 dpi having a thickness of 4 dots along the fast scanning direction. Regarding the formation of the solid image, a sheet of the recording medium was cut into an A5-size, and a solid image was formed by jetting the ink onto the entire one surface of the sample.

When the images were recorded, the treatment liquid was jetted from treatment liquid jetting head 12S onto the recording medium in a single-pass manner, and then the treatment liquid was dried in treatment liquid drying zone 13. Conveyance of the recording medium was controlled so as to pass through the treatment liquid drying zone within 900 msec after the initiation of the jetting of the aqueous treatment liquid. In treatment liquid drying zone 13, while the spotted aqueous treatment liquid was heated with an infrared heater from the side (back side) of the recording medium that was opposite to the surface at which the treatment liquid was spotted such that a film surface temperature was maintained at 40 to 45° C., hot air having a temperature of 120° C. was blown from a blower to the recording surface, and the air volume was changed to achieve a desired drying amount. Subsequently, the cyan ink was jetted from cyan ink-jetting head 30C in a single pass manner to record an image. Then, in a manner similar to the above, drying of the ink was performed in ink drying zone 15 by blowing a hot air having a temperature of 120° C. and a velocity of 5 m/sec from a blower to the recording surface for 15 seconds while heating with an infrared heater from the side (back side) of the recording medium that was opposite to the surface at which the ink was spotted. After images were dried, the images were irradiated with UV light (Metal halide lamp, Manufactured by EYE GRAPHICS Co., Ltd., Maximum irradiation wavelength of 365 nm) in the UV irradiation unit 16 so that the total dose was 3 J/cm², and thus the images were cured. With respect to the magenta ink (Ink 12), images were formed in the same manner as in the above-described cyan ink, except that the magenta ink was placed in the storage tank (not illustrated) connected to the magenta ink ejection head 30M.

Evaluation

1. Recovery from leaving (ejection stability when ejection of an enk composition is stopped, and then after a head is left as it is for a given period of time, the ejection is ee-started on an ink-jet recording cevice)

1-dot-wide lines were output from each nozzle onto an A5-size U-LITE, and the head after outputting was left as it was for a given period of time. Thereafter, 1-dot-wide lines were output again from each nozzle onto the A5-size U-LITE. The image output was repeated while varying the time for which the head was left as it was (leaving time), and the printing state of the output lines before and after the leaving were compared. Then, the leaving time at which the number of lines that were not output after the leaving became 30% or more of the number of the output lines before the leaving was measured and evaluated.

Evaluation Criteria

1: Leaving time at which 30% or more of the number of the output lines before leaving are not output is 60 minutes or more.

2: Leaving time at which 30% or more of the number of the output lines before leaving are not output is 30 minutes or more and less than 60 minutes.

3: Leaving time at which 30% or more of the number of the output lines before leaving are not output is 20 minutes or more and less than 30 minutes.

4: Leaving time at which 30% or more of the number of the output lines before leaving are not output is 10 minutes or more and less than 20 minutes.

5: Leaving time at which 30% or more of the number of the output lines before leaving are not output is less than 10 minutes.

The range of 1 to 3 is not problematic in practical use.

2. Blocking Resistance

A5-size samples on the entire surface of which solid images were formed were left alone under an environment of 25° C. and 50% RH for 72 hours. Then, the solid image surfaces of two samples after leaving were disposed on top of each other, a load of 1 kg/cm² was applied thereto, and the samples were left alone under an environment of 80° C. and 30% RH for 16 hours. Thereafter, the samples were returned to the environment of 25° C. and 50% RH, and left alone for 24 hours. Thereafter, the samples were removed, and then the image surfaces were visually observed and evaluated under the following evaluation criteria.

<Evaluation Criteria>

1: Damage is not observed on the image surface.

2: The surface gloss changes.

3: The images are partially destroyed in the shape of a spot.

4: 10% or more of the images are destroyed.

The range of 1 to 2 is not problematic in practical use.

3. Curing Properties

A5-size samples having solid images formed on the entire surface thereof were left alone under the environments of 25° C. and 50% RH for 72 hours. Then, the solid image surfaces of the samples after leaving were disposed on a non-recorded U-LITE (hereinafter referred to as a non-used sample in this evaluation), and then were rubbed back and forth 10 times under a load of 200 kg/m². Thereafter, the non-used sample and the solid images were visually observed and evaluated in accordance with the following evaluation criteria.

<Evaluation Criteria>

1: The color did not adhere to the non-used sample and deterioration of the rubbed solid images was not observed.

2: The color adhered to the non-used sample but the deterioration of the rubbed solid images was not observed.

3: The color adhered to the non-used sample and a part of the rubbed solid images was deteriorated.

4: Much amount of colors adhered to the non-used sample and almost of the rubbed solid images was deteriorated.

5: The rubbed solid images dropped out and the sheet surface (U-LITE) was exposed.

The range of 1 to 3 is not problematic in practical use.

TABLE 2

| | Pigment | Polymerizable compound (A) | Water-soluble solvent (B) | B/A | Treatment liquid | Recovery from leaving | Blocking resistance | Curing properties | Remarks |
|---|---|---|---|---|---|---|---|---|---|
| Ink 1 | PB15:3 | Polymerizable compound 1 | DEGmEE | 0.65 | Treatment liquid 1 | 1 | 1 | 2 | Present invention |
| Ink 2 | PB15:3 | Polymerizable compound 1 | DEGmEE | 0.5 | Treatment liquid 1 | 1 | 1 | 1 | Present invention |
| Ink 3 | PB15:3 | Polymerizable compound 1 | DEGmEE | 0.1 | Treatment liquid 2 | 2 | 1 | 1 | Present invention |
| Ink 4 | PB15:3 | Polymerizable compound 2 | DEGmEE | 0.5 | Treatment liquid 1 | 1 | 1 | 1 | Present invention |
| Ink 5 | PB15:3 | Polymerizable compound 3 | DEGmEE | 0.59 | Treatment liquid 1 | 1 | 1 | 1 | Present invention |
| Ink 6 | PB15:3 | Polymerizable compound 4 | DEGmEE | 0.32 | Treatment liquid 1 | 3 | 1 | 1 | Present invention |
| Ink 7 | PB15:3 | Polymerizable compound 1 | DEGmEE | 0.5 | Treatment liquid 2 | 1 | 1 | 1 | Present invention |
| Ink 8 | PB15:3 | Polymerizable compound 2 | TPGmME | 0.5 | Treatment liquid 1 | 1 | 1 | 1 | Present invention |
| Ink 9 | PB15:3 | Polymerizable compound 2 | DEG | 0.5 | Treatment liquid 1 | 1 | 1 | 3 | Present invention |
| Ink 10 | PB15:3 | Polymerizable compound 2 | GP250 | 0.61 | Treatment liquid 1 | 2 | 2 | 1 | Present invention |
| Ink 11 | PB15:3 | Polymerizable compound 2 | 1,2-hexanediol | 0.5 | Treatment liquid 1 | 1 | 1 | 2 | Present invention |
| Ink 12 | PR122 | Polymerizable compound 2 | DEGmEE | 0.5 | Treatment liquid 1 | 1 | 1 | 1 | Present invention |
| Ink 13 | PB15:3 | Polymerizable compound 2 | DEGmEE | 0.08 | Treatment liquid 1 | 5 | 2 | 5 | Comparative example |
| Ink 14 | PB15:3 | Polymerizable compound 2 | DEGmEE | 0.7 | Treatment liquid 1 | 3 | 4 | 5 | Comparative example |
| Ink 15 | PB15:3 | Polymerizable compound 5 | DEGmEE | 0.5 | Treatment liquid 1 | 5 | 3 | 5 | Comparative example |

As shown in Table 2, in the Examples, excellent effects were obtained in terms of ejection stability (recovery from leaving) in a case in which ejection of an ink composition is stopped, and then after a head is left as it is for a given period of time, the ejection is re-started on an ink-jet recording device, and further images having excellent curing properties and blocking resistance were obtained. In contrast, in the Comparative Examples, sufficient effects were not obtained in any evaluation.

All publications, patent applications, and technical standards mentioned in this specification are herein incorporated by reference to the same extent as if each individual publication, patent applications, or technical standards was specifically and individually indicated to be incorporated by reference.

What is claimed is:

1. An image forming method comprising:
applying an ink composition comprising a pigment, a water-soluble polymerizable compound (A) comprising an acrylamide structure in a molecule thereof, a water-soluble solvent (B), and water, in which a mass ratio of the polymerizable compound (A) and the water-soluble solvent (B) satisfies $1/10 \leq B/A \leq 2/3$, to a recording medium comprising coated paper by an ink-jet method; and
applying a treatment liquid to the recording medium, the treatment liquid comprising a coagulant that aggregates ingredients in the ink composition,
wherein the ingredients in the ink composition aggregate to form an image upon contacting the treatment liquid with the ink composition.

2. The image forming method according to claim 1, wherein the coated paper comprises a base paper and a coat layer comprising an inorganic pigment.

3. The image forming method according to claim 1, wherein an SP value of the polymerizable compound (A) is in the range of from 9 to 11.5 $(cal/cm^3)^{0.5}$.

4. The image forming method according to claim 1, wherein the polymerizable compound (A) is represented by the following Formula (1):

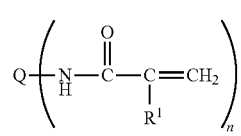

Formula (1)

wherein, in Formula (1), Q represents an n-valent linking group; $R^1$ represents a hydrogen atom or a methyl group; and n represents an integer of 1 or more.

5. The image forming method according to claim 1, wherein an SP value of the water-soluble solvent (B) is in the range of from 9 to 13.5 $(cal/cm^3)^{0.5}$.

6. The image forming method according to claim 1, wherein the pigment is a water dispersible pigment, at least one portion of the surface of which is covered with a polymer dispersant.

7. The image forming method according to claim 6, wherein the polymer dispersant comprises a carboxyl group.

8. The image forming method according to claim 6, wherein the polymer dispersant has an acid value of 100 mgKOH/g or lower.

9. The image forming method according to claim 1, wherein the coagulant in the treatment liquid comprises an organic acid.

10. The image forming method according to claim 1, wherein at least one of the ink composition or the treatment liquid further comprises an initiator that initiates polymerization of the polymerizable compound by an active energy ray.

11. The image forming method according to claim 1, wherein the coagulant is a compound that can change the pH value of the ink composition, a polyvalent metal salt, a polymer having a quaternary amine, or a polymer having a tertiary amine.

12. The image forming method according to claim 11, wherein the compound that can decrease the pH value of the ink composition is selected from the group consisting of sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives thereof, and salts thereof.

13. The image forming method according to claim 1, wherein the coagulant is a compound that can decrease the pH value of the ink composition.

14. The image forming method according to claim 1, wherein the coagulant is a polyvalent metal salt selected from the group consisting of: a salt of an alkaline earth metal, which belongs to Group 2 of the Periodic Table; a salt of a transition metal belonging to Group 3 of the Periodic Table; a salt of a metal belonging to Group 13 of the Periodic Table; and a salt of a lanthanide.

15. The image forming method according to claim 1, wherein the coagulant is a polymer having a quaternary amine or a polymer having a tertiary amine.

* * * * *